United States Patent [19]
Akins et al.

[11] Patent Number: 5,309,555
[45] Date of Patent: May 3, 1994

[54] REALTIME COMMUNICATION OF HAND DRAWN IMAGES IN A MULTIPROGRAMMING WINDOW ENVIRONMENT

[75] Inventors: Anthony S. Akins, Pearland; Peter A. Lee, Houston; Gunnar P. Seaburg, Friendswood, all of Tex.; Gordon W. Arbeitman, Potomac, Md.

[73] Assignee: International Business Machines Corporation, Armonk, N.Y.

[21] Appl. No.: 882,997

[22] Filed: May 14, 1992

Related U.S. Application Data

[63] Continuation of Ser. No. 524,770, May 15, 1990, abandoned.

[51] Int. Cl.$^5$ .............................................. G06F 15/62
[52] U.S. Cl. ................................... 395/157; 395/153; 395/155; 395/163
[58] Field of Search ............................... 340/706-721; 395/153, 155-158, 162-163; 345/119

[56] References Cited

U.S. PATENT DOCUMENTS 4,977,520 12/1990 McGaughey, III et al. ... 395/153 X
5,119,319 6/1992 Tanenbaum ..................... 395/153 X Primary Examiner—Mark K. Zimmerman
Assistant Examiner—Almis Jankus
Attorney, Agent, or Firm—John E. Hoel; Jeffrey S. LaBaw

[57] ABSTRACT

An advanced user interface operates in an integrated operating environment which supports realtime handwriting, graphical and image data. The integrated operating environment is capable of running several application programs on a standard stand-alone processor, such as a personal computer, each in its own display window. A communication window is established in a first window. Image data is imported into it from a second window. And freehand drawing data is added to the first window. The contents of the first window can then be sent to a second processor. In this manner, hand drawn images can be combined with other image data and communicated over a network.

7 Claims, 11 Drawing Sheets

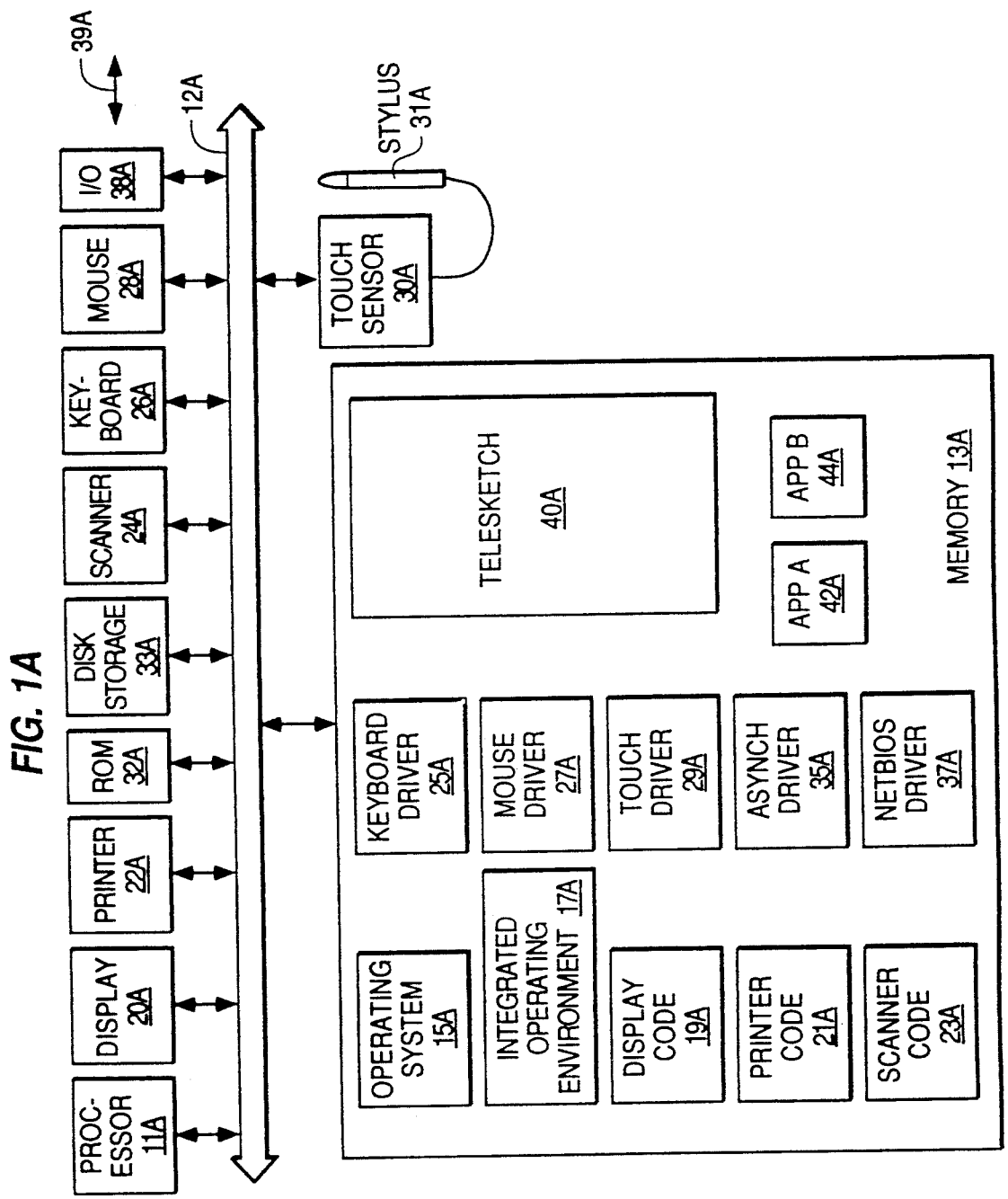

REALTIME COMMUNICATION OF HAND DRAWN IMAGES IN A MULTIPROGRAMMING WINDOW ENVIRONMENT

This application is continuation of U.S. Ser. No. 07/524,770 filed May 15, 1990, now abandoned.

DESCRIPTION

Field of the Invention

The present invention relates generally to electronic data processing systems which allows real time conferencing of image data. More particularly, it relates to a method and apparatus for providing a realtime conference facility which transmits freehand drawings, graphical data, image data and screen capture bitmap data between remote data processing systems connected by a variety of communications media.

BACKGROUND OF THE INVENTION

Communication activities such as face to face meetings are a large part of the typical businessman's daily activities. It is recognize that a meeting with all the necessary parties, which allows a spontaneous exchange of information is often the spark which leads to important decisions. However, there is a great desire to avoid the cost, dislocation delays and inconveniences associated with travel. While voice telephone communication is readily available for long distance communication, it is limited in the types of information which can be transmitted. While there have been many efforts in the past to provide automated communication facilities which integrate voice and image data, relative few of these system are commercially available. The systems are expensive and typically require high speed phone lines as well as special video equipment.

Many conferencing systems have been proposed in the prior art. All of these system, while providing image data in addition to voice data, require dedicated proprietary hardware. All parties must have the same equipment and are often medium specific. A given prior art system may operate effectively on telephone lines, yet have no provision for local area network or other data line communication. The necessity for specialized hardware has limited the appeal and acceptance of the prior art conferencing systems. Other deficiencies in the prior art include the limitation of the sources of image data transmitted to the remote data processing systems. A particular conferencing system will contain provisions for input from hand drawn messages from a digitizing tablet, but will contain no provision for image input from scanners or other nonvolatile storage of images. Other prior art systems may contain provisions for facsimile or video data, but contain no provision for hand writing data. These deficiencies might be overcome if it were possible to link several of the prior art systems together. However, the prior art methods typically operate in closed environments, i.e., they do not interact with other software or hardware, thus preventing the importation of facilities from other transmission devices or software.

In view of the deficiencies of the known prior art it would be advantageous to provide a method and generalized apparatus which allows multiple users to carry on long distance conferencing activities independent of special hardware. Optimally, the apparatus and method would allow input from a variety of graphical and image sources, as well as providing an open architecture to take advantage of feature not originally programmed or provided and to keep up with future advances in image devices and hardware.

SUMMARY OF THE INVENTION

It is therefore an object of the invention to allow multiple users to interact in a realtime conferencing facility supporting freehand drawing, graphical function and image data.

It is another object of the invention to provide a realtime conferencing facility which does not require specialized hardware or a particular communications medium.

It is still another object of the invention to allow a user to select from a plurality of image data derived from a variety of input devices namely a touch sensor, a scanner, a television camera and previously stored image data from disk storage.

It is yet another object of the invention to accommodate input from other application software which may be running on the apparatus of the present invention.

These objects and others are accomplished by an advanced user interface which operates in an integrated operating environment. The integrated operating environment and its associated operating system is capable of running a plurality of application programs running on a standard standalone processor, such as a personal computer. In the preferred embodiment, a processor is coupled to a system bus which is also coupled to a memory. The memory stores a set of program instructions as code modules. Some of these code modules contain instructions for a variety of input devices which are also coupled to the system bus. Other code modules contain instructions which control printer and display functions of the data processing system. Further, the memory also contains a plurality of applications which operate within an integrated operating environment and pass data in a compatible manner. One of the applications provides a realtime conferencing facility supporting freehand drawings, graphical and image data.

The Telesketch Application an application which uses a touch interface to provide a "real time conference facility" using freehand drawings and images. Freehand figures can be drawn in the Telesketch window using a touch pointing device or a mouse pointing device. The image seen in the local Telesketch window is also seen on another window of the Telesketch application running on a remote machine. The computer systems may be connected via asynchronous (modem/dialup) lines, or via NETBIOS sessions across a Token-Ring LAN. System users at each end of the connection may draw on the shared underlying image, while speaking with each other over the telephone. In addition to freehand drawing, Telesketch provides a number of simple image primitives to easily produce lines, rectangles, filled rectangles, circles, filled circles, and erased rectangles with the touch stylus or finger. Text may also be entered into the image using the keyboard. Images may also be scanned from documents using a scanner compatible with the operating system running on the local machine. Combining the Telesketch scanning and communications features makes it possible to use Telesketch like a facsimile machine. Images may be "captured" from the currently available other desktop application windows in the operating environment and placed within the current Telesketch image. In the preferred embodiment, images may also be pasted from the Presentation Manager ™ clipboard into the Telesketch image. The intent of Telesketch is to focus on the remote conference capabilities provided rather than image editing functions. It is assumed that a full-fledged image editing program of some sort will be available and used if complex image editing is desired. The invention allows multiple people to participate in a Telesketch conference at the same time.

BRIEF DESCRIPTION OF THE DRAWINGS

The above objects and other objects features and advantages of the present invention will be more fully appreciated with reference to the following drawings.

FIGS. 1A and 1B are block diagrams of two computer systems in realtime communication using freehand drawing and image data according to the present invention.

DESCRIPTION OF PREFERRED EMBODIMENT

The invention is preferably implemented in two or more stand alone processors such as a personal computers, i.e., the IBM PS/2 ™ computer. These computers can be connected by any number of communication media including a local area network (LAN) or other data link lines, ISDN or regular phone lines, cellular phones or satellite communications networks. Further, the invention could be implemented in a distributed data processor such as an IBM 3090 mainframe attached to plurality of individual workstations. In general, the invention can be implemented on any hardware configuration which includes the components described in the following illustrative embodiment.

Figure 1B:
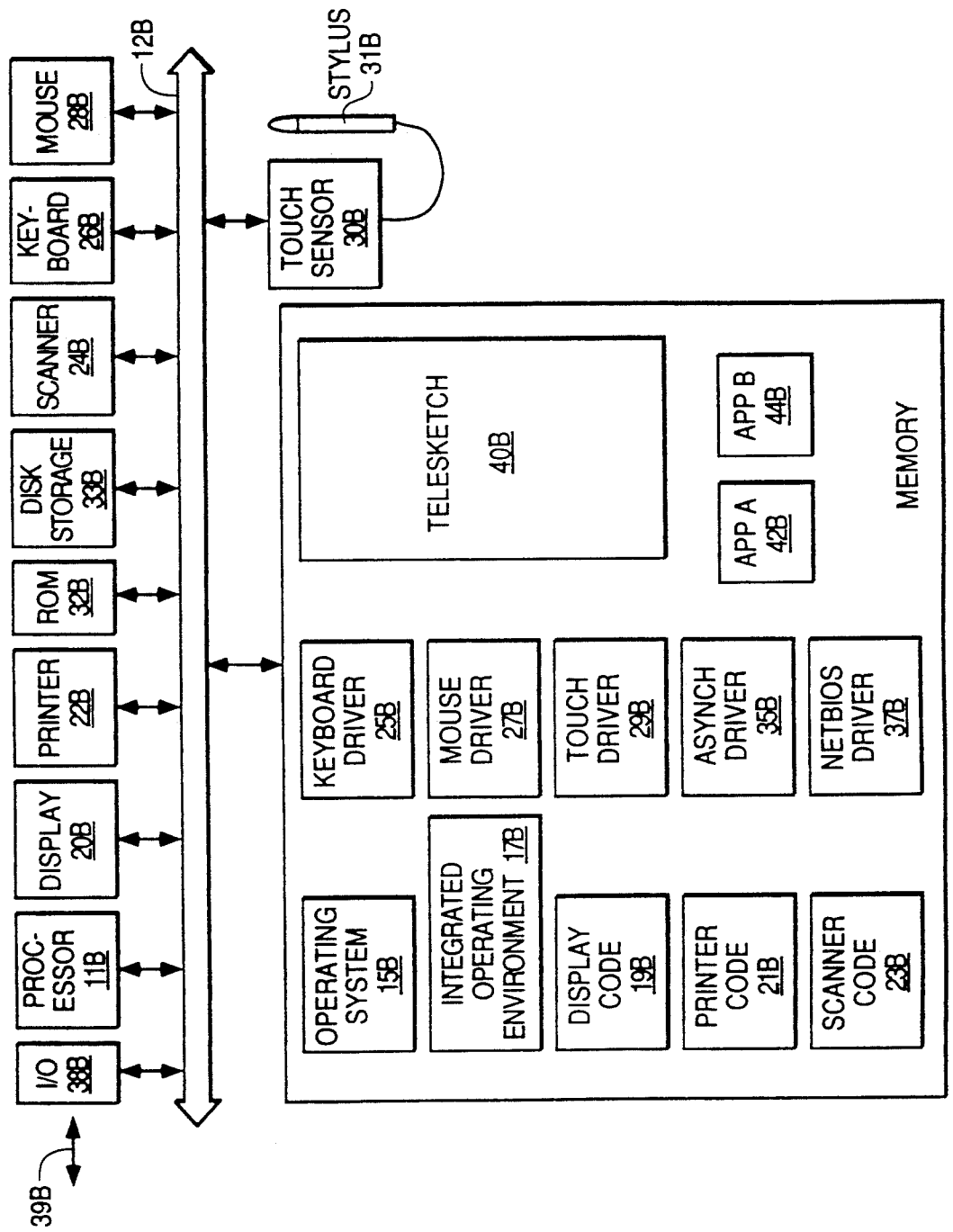

The preferred embodiment of the invention utilizes two or more data processing systems as depicted in FIGS. 1A and 1B. For clarity of discussion, only the interconnections of the data processing system in FIG. 1A are discussed. The data processing system in FIG. 1B in this example is set up in an identical manner. A processor 11A is connected via system bus 12A to a memory 13A. The memory 13A stores a set of program instructions in the form of code modules which the processor 11A utilizes to control the elements of the data processing systems. General operating system functions are handled by the code in module 15A. The integrated operating environment code module 17A allows applications stored in memory 13A to interact with each other. In the preferred embodiment discussed in the following pages, the operating system 15A is OS/2 ™. Also, in the preferred embodiment, the integrated operating environment 17A is or Presentation Manager ™.

The memory 13A also contains code modules which control specific components of the data processing system. The display code 19A is used to control presentation of information to the user on the display 20A. Printer code 21A is used to control output by the printer 22A. FIG. IA also depicts a number of input devices by which the user can input data into the data processing system. Scanner code 23A interprets the electrical signals sent by scanner 24A when a document is scanned and converted to a bitmap for further processing. The keyboard driver 25A interprets user inputs from the keyboard 26A, as the mouse driver 27A interprets electrical signals generated by the mouse 28A. The preferred embodiment is particularly adapted to operate with the touch driver 29 and touch sensor 30A and stylus 31A described in commonly assigned U.S. Pat. No. 4,868,332 to E. Greanias et al., entitled "Combined Finger Touch and Stylus Detection System For Use On the Viewing Surface Of A Visual Display Device", filed Jun. 26, 1986 which is hereby incorporated by reference. However, any touch sensor device which supports handwriting or freehand drawing could be utilized in the present invention. Also, included in the data processing system of FIG. 1A is a read only memory 32A which contains fixed instructions executed by processor 11A to carry out elementary operations for the computer system. Disk storage 33A can permanently store code modules when they are not in use in memory 13A. The asynchronous driver code 35A and the NETBIOS driver code 37A control communications between the data processing system via the I/O devices 38A. The asynchronous driver is used for communication to the remote computer system in FIG. 1B via a modem and telephone lines 39A, where as the NETBIOS striver 37A is used for communications over a local area network (LAN) 39A to the remote computer system in FIG. 1B. Although only two communication media are depicted in the preferred embodiment, the present invention can utilize any suitable transmission medium. Finally, the memory 13A also stores several application programs 40A, 42A, 44A one of which is Telesketch 40A. It is envisioned that one of the other applications running on the system would be a full fledged editing application program.

Figure 2:
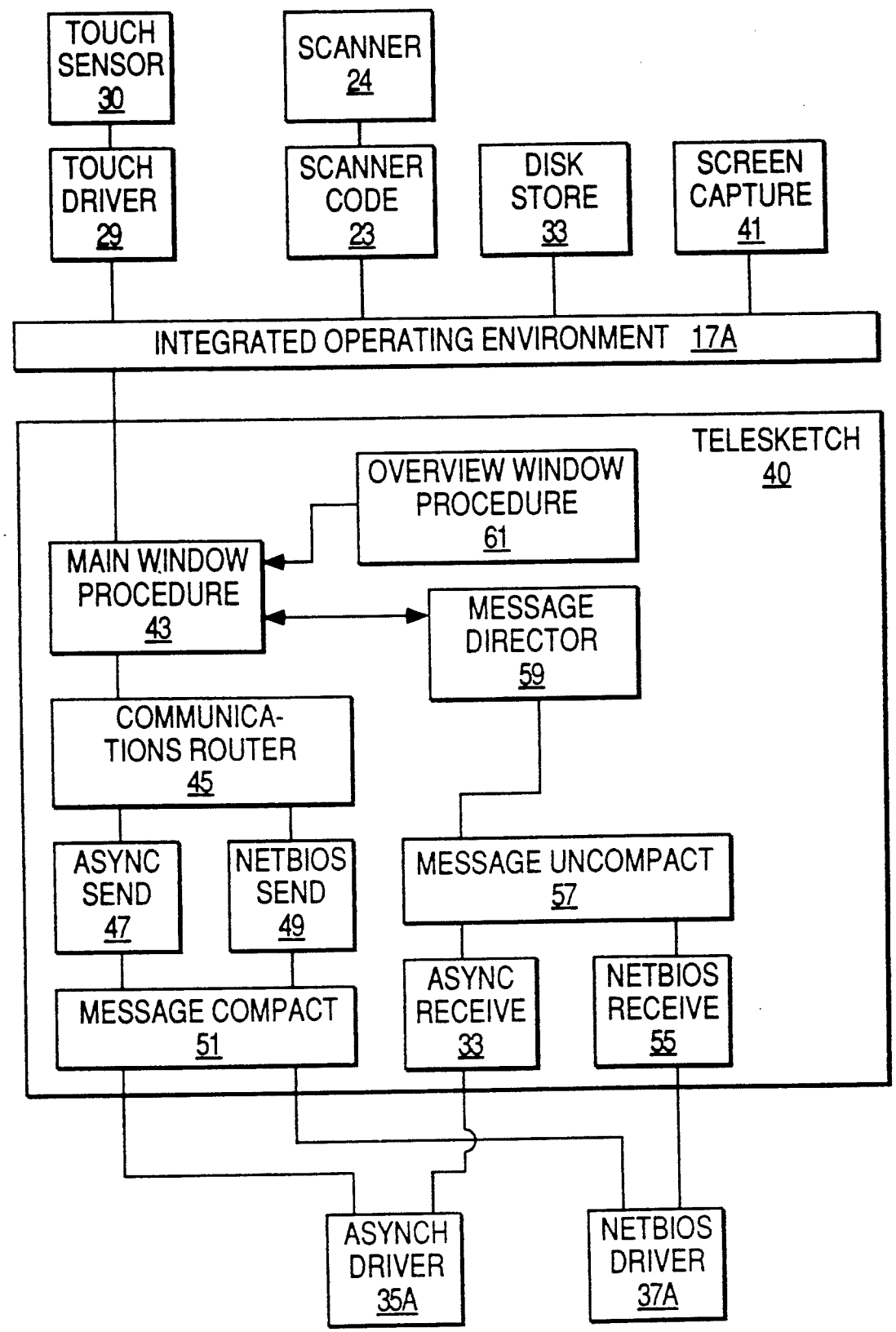
FIG. 2 is a block diagram of components of the Telesketch computer module which controls communication between the two systems depicted in FIGS. 1A and 1B.

As depicted in FIG. 2, Telesketch 40 contains a number of separate program modules. These modules work together as described below. The main window procedure 43 is a standard Presentation Manager (PM) application window. It handles all of the regular PM messages which result from user input such as mouse pointer movements, button presses, and key strokes as well as input from the touch sensor 30, scanner 24 and bitmaps from the disk storage 33. The application 40 also handles bitmaps from a screen capture program 41 which may optionally be incorporated in the code package with Telesketch 40. The main window procedure 43 is responsible for updating the common underlying image and scrolling the locally viewed image, and all of the typical actions caused by local user input at the Telesketch window. Further, this module 43 controls the various communication states and connections between the other modules of the application.

Outgoing drawing and protocol messages are sent from the main window procedure 43 to the communication router 45 if a remote connection has been established. The communications router 45 performs preliminary compaction 51 (compression) of outgoing messages from the main window procedure 43 and calls the appropriate send function depending upon the current connections to the remote data processing system. Messages destined to be sent to an asynchronous connection such as a telephone line are placed in a circular buffer which is used by the asynchronous send module 47. Messages destined for a local area network (LAN) are sent directly to the NETBIOS send module 49. Other LAN protocols could be supported in alternate embodiments of the invention. In OS/2 TM , individual subprograms may be assigned individual "threads" to aid processing by the computer system. This multithreaded technique is analogous to multitasking except that separate portions of a single application are divided on to separate threads, rather than separate applications as is the case with multitasking. Because asynchronous communication is relatively slow, Telesketch 40 has been designed so that the asynchronous send module 47 is on a separate thread. However, because LAN communication is very rapid, as compared to asynchronous communication, no separate thread is needed for the NETBIOS send module 49.

Next, the Telesketch message is sent from either the async send module 47 or NETBIOS send module 49 to the message compact module 51. This module 51 compacts (compresses) the Telesketch message into a smaller format for quicker transmission if appropriate. As a local area network has a high band width, a great deal of information can be sent very quickly. It is rarely necessary to compress or compact a message when the communication with the remote data processing system is carried out over a local area network. However, when an asynchronous phone line is used it is almost always necessary to compress the data. The outgoing message is sent to the async driver 35A or a NETBIOS driver 37A as appropriate. In the preferred embodiment, these drivers are not part of the Telesketch application 40, but are part of the operating system 15A. The async driver 35A handles all asynchronous communication, whereas the NETBIOS driver 37A handles all communication over the LAN.

Incoming messages from remote computer systems are handled either by the async driver 35A or the NETBIOS driver 37A. The incoming messages are sent to the async receive module 53 if phoneline is used as a communication medium or the NETBIOS received module 55 if the local area network is used. The async receive module 53 is delegated a separate thread, and continually reads the async device driver 35 for incoming messages. When the message comes in, it is sent to the uncompact function 57 to be uncompacted or decompressed. A separate thread is also used for the NETBIOS receive module 55 which continually reads the NETBIOS driver 57A for incoming data messages. When a LAN message comes, it is sent to the message uncompact function 57 where the message may or may not be decompressed. The message uncompact function 57 is used to expand Telesketch messages from their compressed format into a standard 10 byte format if necessary. Decompression is generally not be necessary for messages handled via over the LAN.

The message director module 59A handles incoming Telesketch messages from the remote data system. Some processing functions are included in a message director 59A. In some cases, however, the messages are simply posted to the main window procedure 43A for processing.

Figure 9:
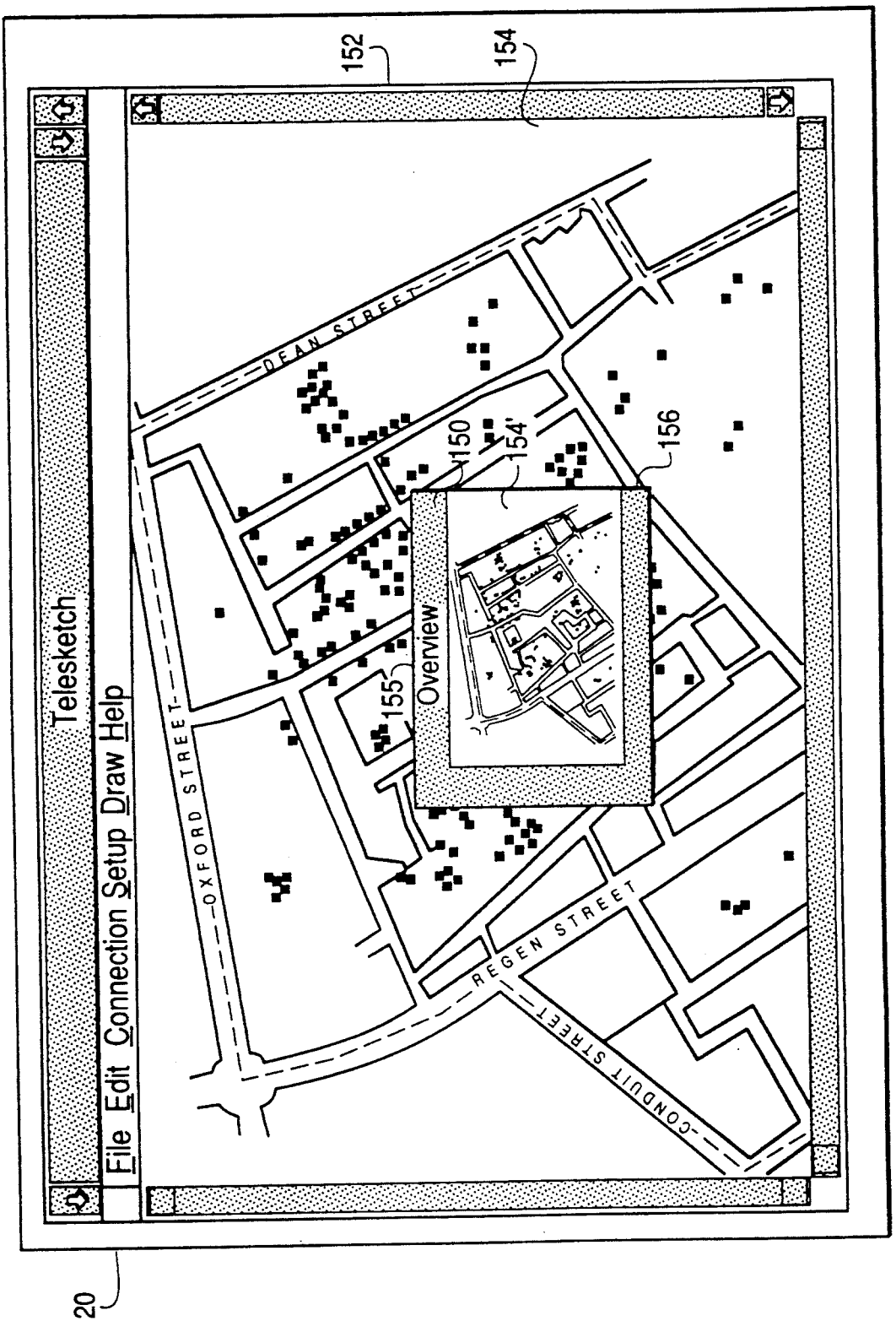
FIG. 9 is a pictorial representation of the overview window feature of the present invention.
Figure 10:
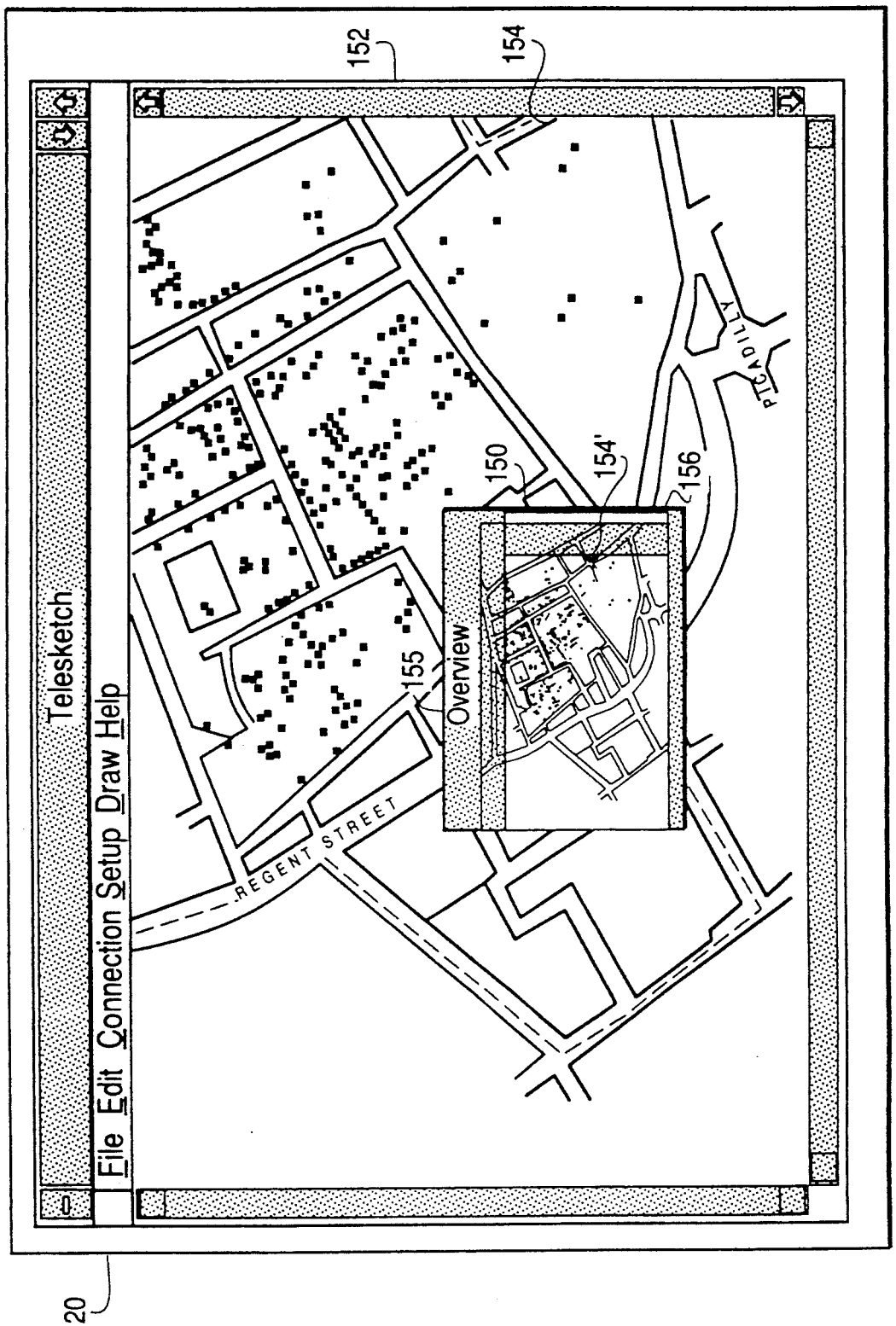
FIG. 10 is a pictorial representation of the overview window depicted in FIG. 9 after the user has scrolled his individual workspace.

The overview window procedure 61 handles a reduced version of the Telesketch image displayed by the main window procedure 43 on the display of the data processing system. It depicts the local and remote users' screen position within the overall image. Further discussion of the overview window in connection with FIGS. 9 and 10 is found below.

Figure 3:
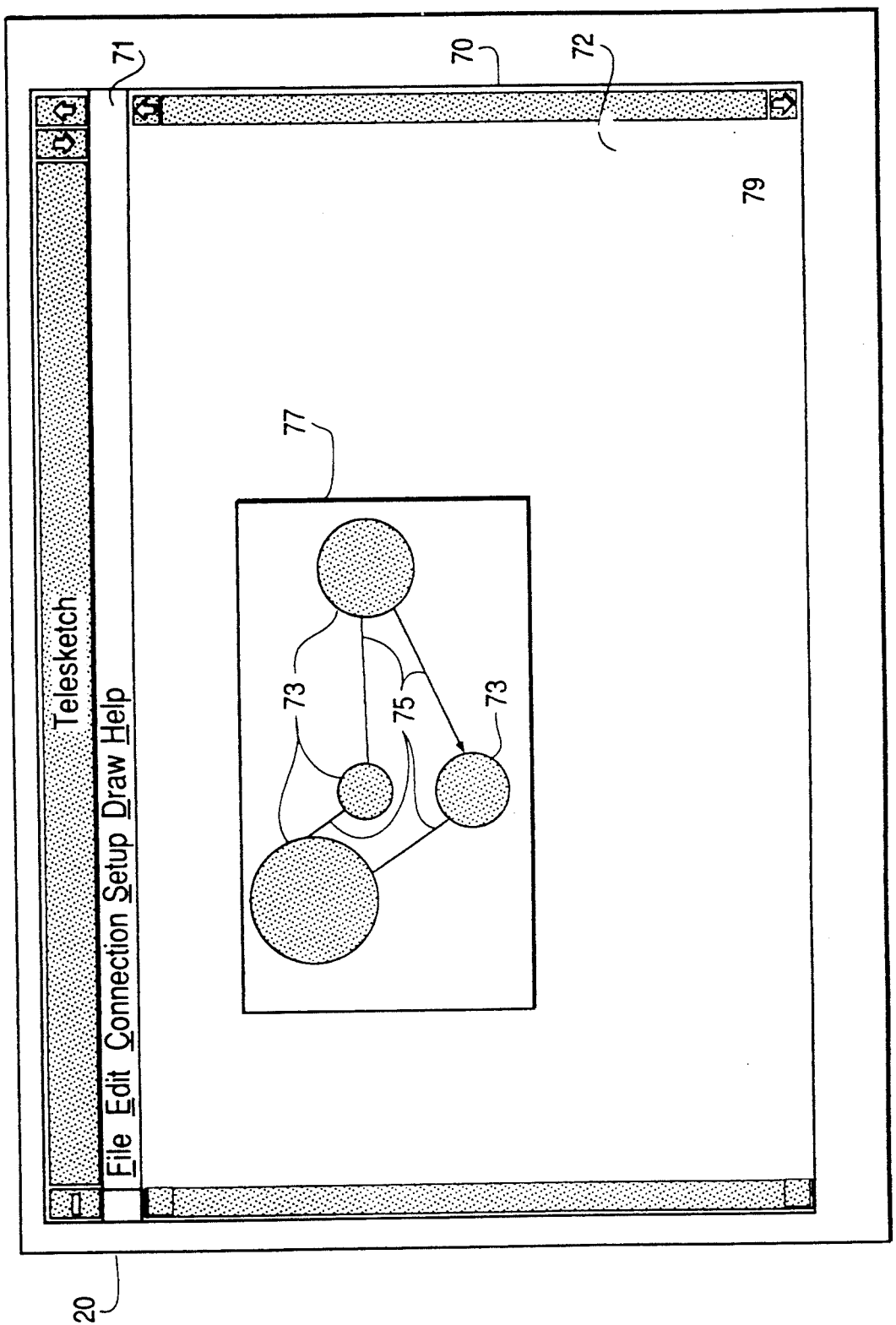
FIG. 3 is a pictorial representation of a display window according to the present invention in which geometric functions and freehand drawings have been utilized.

FIG. 3 is a pictorial representation of the Telesketch window according to the present invention in which the geometric functions of Telesketch and the freehand drawing capability of the touch sensor 30A have been utilized to create the window image. In Presentation Manager( TM ) 17A, a set of rules called Common User Access (CUA) have been developed to make the graphical user interface of applications which run on Presentation Manager( TM ) 17A consistent. Telesketch 40A follows the CUA rules in presenting the information. The Telesketch window 70 has an action bar 41 from which the user can select of the Telesketch functions. The client area 72 is used to display the shared image, common to both computer systems engaged in electronic conference. The client area 72 is also the primary workspace in which the user enters data into the Telesketch application 40A.

As Telesketch 40A is a Presentation Manager( TM ) compatible application it can import data from other Presentation Manager( TM ) applications. This can be accomplished either by the screen capture function 41 or by "cutting and pasting" output from the other application programs 42A, 44A to the Presentation Manager( TM ) clipboard. With the Presentation Manager( TM ) clipboard the other program needs to know how to interact with the clipboard with the screen capture function 41, a screen can be built where the application does not understand how to interact with different PM applications. The screen capture program 41 allows the user to build images using another application program i.e., a page maker could be used for sizing a figure or a paint program could be used for sophisticated pictures or a graphics program could be used to rotate a geometric figure or perform other geometric functions.

Figure 4:
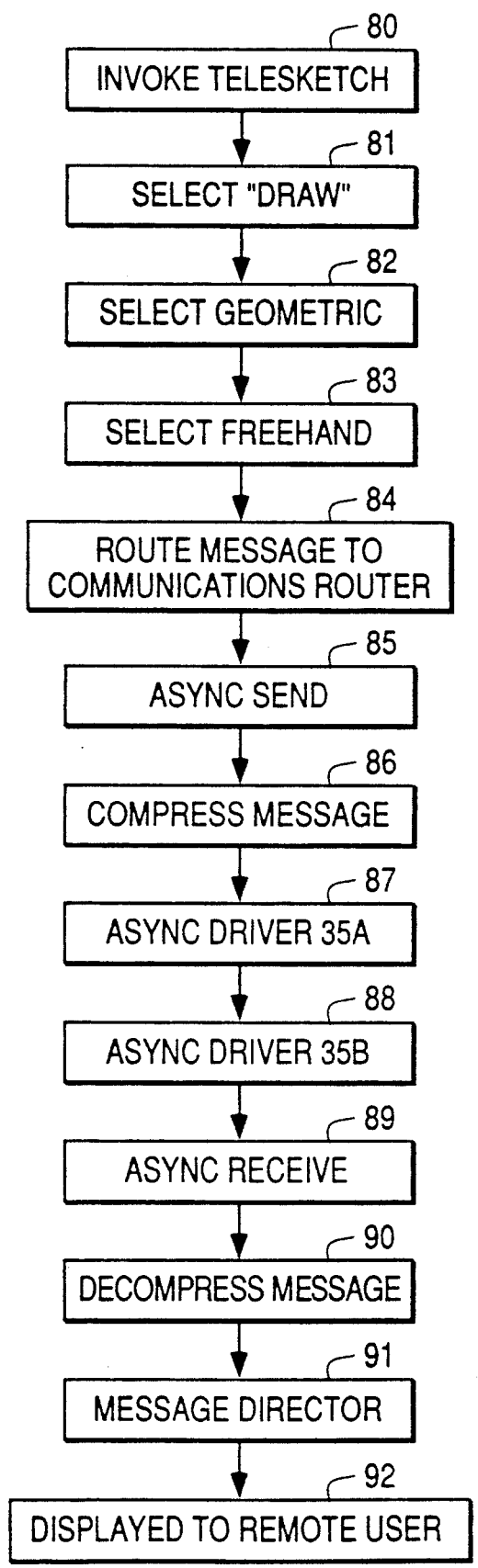
FIG. 4 is a flow diagram of a method according to the present invention which can generate the pictorial representation of FIG. 3.

In the Telesketch window 70 in FIG. 3, the user has assembled an image using the geometric function of Telesketch and by freehand drawing on the touch sensor. First, the user moves the mouse pointer or the stylus to the draw action in the action bar 71. When the appropriate user input is made, e.g., a double click with a mouse button, a menu pulldown appears on the menu to allow the user to begin geometric and/or freehand drawing in the window 70. As illustrated in FIG. 3, the user first has drawn a series of filled circles 73 which are then connected with four lines 75, and finally has enclosed the circles 73 and lines 75 with a rectangle outline 77. Next, the user selects the freehand subaction from the pulldown to add the note 79 to the client area 72 of the window 70. FIG. 4 is a flow diagram depicting a steps which would generate the pictorial representation of FIG. 3. In step 80 the user invokes the Telesketch application and opens window 70. Next, the user moves the pointer to the draw action in action bar 71, step 81. In step 82, the user selects the primitive geometric functions to draw filled circles 73 lines 75 and a rectangle outline 77 in the client area 72 of the window 70. Next, the user selects the freehand function from the draw pulldown to write note 79 in the client area 72. As the user is drawing on the touch sensor 30 that is creating the pictorial representation depicted in the client area 72 of the window 70, the information is being routed to the user of the computer system depicted in FIG. 1B. In the case of freehand drawing such as the note 79 the image is being transmitted realtime through the communication lines 39A and 39B. In the case of the geometric FIGS. 73, 75 and 77, the image is not transmitted until the user has finished drawing the figure as indicated by the stylus 31 leaving the surface of the touch sensor 30. The messages are first routed to the communication router in step 84. If the communications between the computer system is carried out by phone line the message is routed to the async send module 47 in step 85. Because of the slow speed of a synchronous communication the message is compacted in step 86 by the message compact module 51. The Telesketch message then leaves the Telesketch application 40 and is sent to the asynchronous driver 35A of the computer system depicted in FIG. 1A. The Telesketch message is then routed through the I/O device 38A to phone lines 39A and 39B to the I/O device 38B of the data processing system in FIG. B. It is then routed to the asynchronous driver 35B of the remote data processing system in step 88. The asynchronous receive module 33 in the remote system is monitoring the asynchronous driver 35B for incoming messages. After receipt, in step 90, the async receive module sends the compressed message to the message uncompact module 57 to decompress the message step 90. After decompression, the Telesketch message is sent to the message director 59 in step 91 which hands it off to the main window procedure 43 to be displayed to the remote user in step 92.

Figure 5:
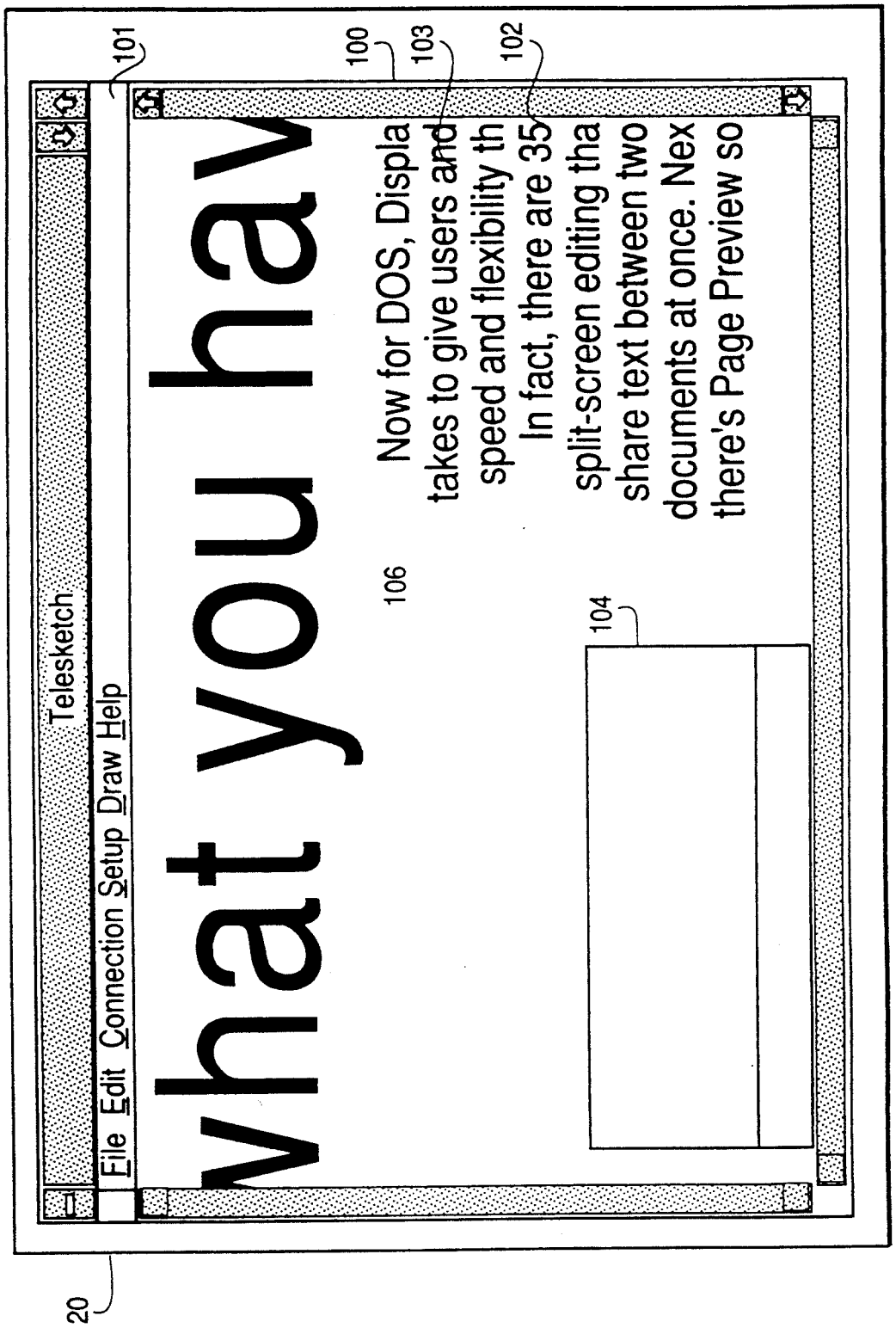
FIG. 5 is a pictorial representation of a display window according to the present invention in which the user has annotated scanner input.

FIG. 5 is a pictorial representation of the Telesketch window 100 in which a newspaper article has been scanned by scanner 24 and has been reduced to a bitmap for presentation in client area 102 by the user of the computer system in FIG. 1A. The scanned image was then sent to the user of the computer system in FIG. 1B who added the rectangle outline 104 and a freehand drawing annotation 106. To scan the newspaper article into Telesketch 40, the first user moves a pointer to the edit action in action bar 101, to activate the scan subaction found in the pulldown of edit. Similar to the embodiment depicted in FIG. 3, both the graphic rectangle outline and the freehand annotation 106 are accomplished by the second user through the use of the draw action in action bar 101.

Figure 6:
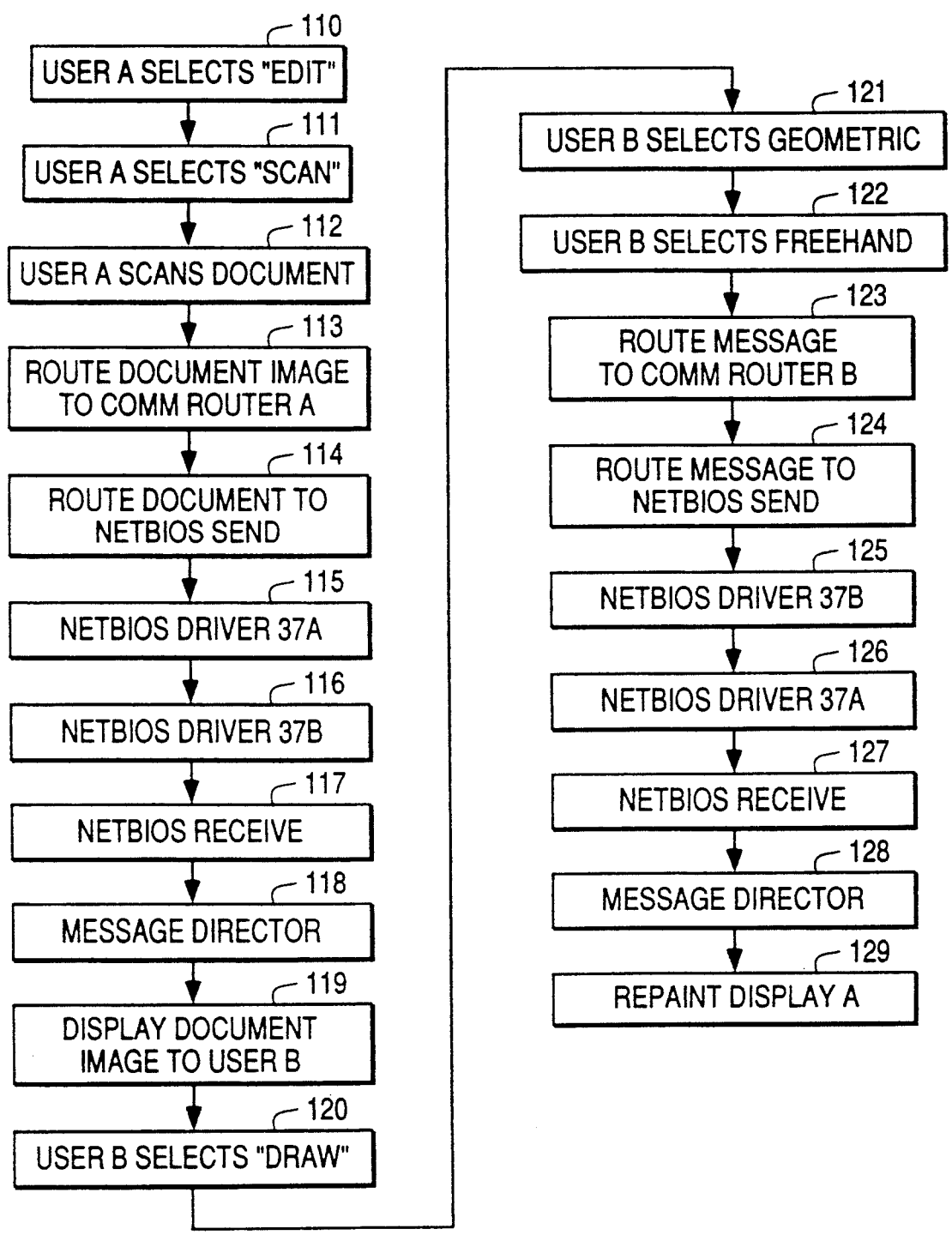
FIG. 6 is a flow diagram depicting a method by which the pictorial representation of FIG. 5 may be generated.

FIG. 6 depicts a flow diagram of the steps used to generate the pictorial representation of the Telesketch 100 in FIG. 5. In step 100, user A, the user of the computer system in FIG. 1A, selects the edit action from action bar 101 after the pulldown is displayed, step 111, the user selects scan. Thereupon the user scans the newspaper article into the scanner 24 to generate the bitmap representation of the newspaper article to be displayed in the local and remote Telesketch windows 100. The bitmap image is then routed through the communications router 45 in the first computer system step 113. Further, the document image is sent through to the NETBIOS send 49 to communicate between the two computer systems beyond local area network. As a local area network has a sufficient band width to eliminate the need for compression, no compression of the bit image is preformed in the message compact module 51. Instead, the next step 115 is to route the document to the NETBIOS driver 37A in the computer system of FIG. IA. The bitmap image is then sent via LAN 39 to the NETBIOS driver 37B of the remote computer system depicted in FIG. 1B. The bitmap image is then routed through the NETBIOS receive 55B step 117, a message director 59B, step 118, and is displayed by the main window procedure 43B in the Telesketch application 40B of the remote computer system, step 119. After seeing the scanned image, the user of the remote computer system selects the draw action from action bar 101 in step 120. The user then selects the rectangle outline 104 in step 121 and the freehand drawing option in step 122. The Telesketch messages associated with a freehand note 106 and the rectangle outline 104 are then routed back to the computer in FIG. 1A steps 123 through 128. First, the Telesketch message goes through the communication router 45 in step 123, then to the NETBIOS send module 49 in step 124 and finally to the NETBIOS driver 37B of the remote computer system. The Telesketch message is transmitted over the LAN 39 and received by the NETBIOS driver 37A of the computer depicted in FIG. 1A. The Telesketch message is then routed through the NETBIOS received module 55 step 127. Further, it is taken by the message director 59A in step 128 to be presented to the first user by the main window procedure 43 as the display is repainted in step 129.

Figure 7:
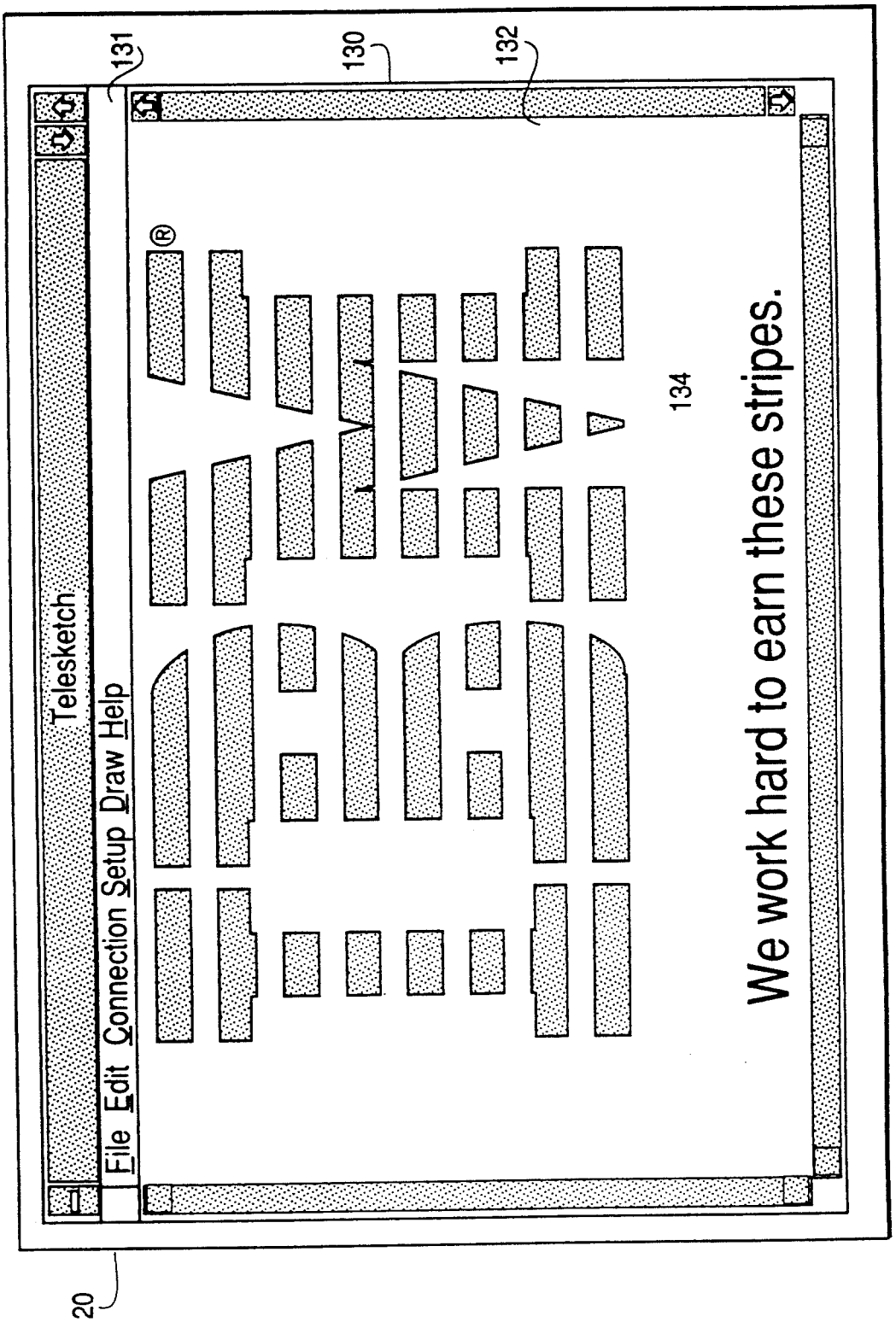
FIG. 7 is pictorial representation of a window according to the present invention in which a bitmap from disk storage has been read in to the application and has been annotated by the user.

FIG. 7 is a pictorial representation of a window according to the present invention in which a bitmap from disk storage 33 has been read into the client area 132 of the Telesketch window 130. The image from disk store 33 is copied into the window by selecting the file action in action bar 131. When the file action is selected the pulldown displays an open subaction which acts as a standard open dialog box in standard CUA applications. The dialog box allows a user to select the bitmap file from disk storage 33 to be loaded into the Telesketch window 130. As indicated in previous examples, the freehand drawing 134 can be entered into the Telesketch window 130 by selecting the draw action from the action bar 131.

Figure 8:
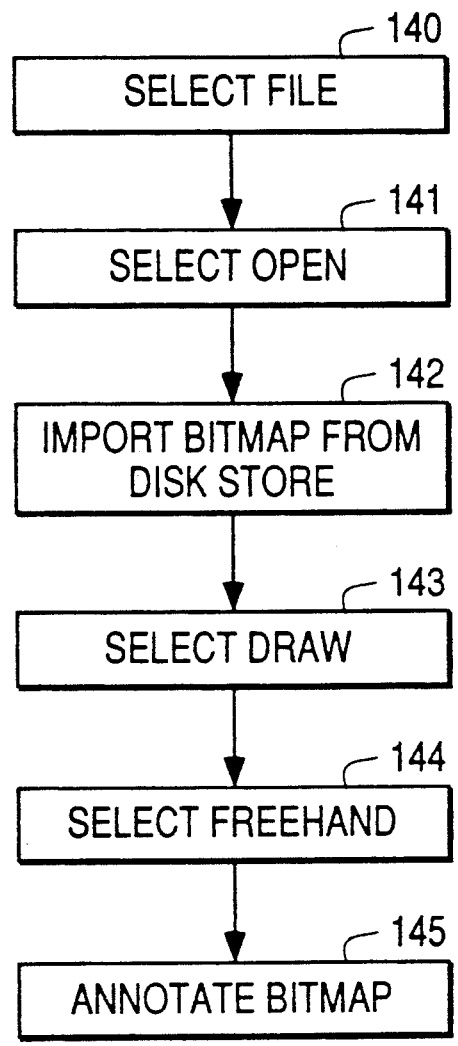
FIG. 8 is the flow diagram depicting a method of generating the pictorial representation in FIG. 7.

FIG. 8 shows a flow diagram for generating the contents of a Telesketch window 130 depicted in the pictorial representation of FIG. 7. No messaging function to the remote computer system is depicted in FIG. 8. In step 140, the user selects a file action from action bar 131. Next, the user selects the open subaction in the pulldown step 141 and imports the bitmap from disk storage 33 in step 142. After the Telesketch window 130 has been filled by the bitmap image the user selects the draw action from the action bar 131 in step 143. Freehand in the preferred embodiment is a default action 144. The user then annotates the bitmap image in step 145.

INTERACTING WITH THE PRIMARY WINDOW

To draw into the Telesketch primary window, the user touches down with the stylus or finger, and moves the pointer around the window. An "ink trail" is created, just like drawing with a pencil and paper.

The start-up window is sized by the shell using FCF_SHELLPOSITION. An underlying bitmap image is first created with an actual size the same as the full screen size. The image displayed in the primary window can be scrolled as desired, using the standard scroll bar controls on the frame.

If the frame window is sized, the underlying image remains in the same position relative to the physical screen. It will not necessarily remain in the same offset relative to the image origin. This has proven to be more intuitive to the user when scrolling and sizing images.

Quick window repainting and scrolling is accomplished by using a bitmap presentation space for the underlying image. All drawing done by the user is drawn into the Telesketch window and also into hpsWork. When a window refresh is needed, i.e, when a WM_PAINT message occurs, the client window is redrawn by simply copying the underlying image from the bitmap presentation space into the client area. Scrolling offsets (controlled by the scroll bars) control which portion of the bitmap is copied into the visible Telesketch window.

If a new image is loaded (using the File+Open, Scan, or Send/Receive image operations), the underlying Telesketch image changes size, in PU_PELS units, not actual size, to match that of the loaded image.

If the user is currently connected to a remote Telesketch system, pointer movements and drawing on either side will also appear on the other end of the communication, if one user is viewing and drawing into a portion of the Telesketch image while the remote person is viewing another portion (the image windows are scrolled differently), the updates will occur relative to the underlying Telesketch image. They will be viewable again if the user scrolls to the corresponding portion of the image.

ACTION BAR AND PULL-DOWNS

The Telesketch windows depicted in FIG. 3, 5, and 7 provide many more features than described above. A more detailed description of the action bar action and pull-down menu subactions follows. The action bar main menu has the following pull-down structure:

File
1. New (disabled, never used)
2. Open . . .
3. Save (disabled, never used)
4. Save As . . .
5. Print
Edit
1. Mark
2. Copy
3. Paste
4. Print Mark
5. Scan . . .
   a. Quick Scan
   b. Full Page . . .
   c. Using Frame . . .
   d. Using Coordinates . . .
6. Erase
7. Capture Screen
8. Send Image
Connection
1. Call . . .
2. Hang Up . . .
3. Beep
Setup
1. Directory . . .
2. Local Name . . .
3. Overview Window
4. Send on Paste
5. Send on Capture Screen
6. Send on Scan
7. Send on Open
Draw
1. Freehand (checked at start-up, default drawing mode)
2. Line
3. Circle
4. Rectangle
5. Erase Rectangle
6. Fill
7. Text
Help
1. Help for help . . .
2. Extended help . . .
3. Keys help . . .
4. Help index . . .
5. Tutorial . . . (disabled, never used)
6. About . . .

These options function as described below. Some of the pull-down choices described in the following are provided in Telesketch for CUA conformance, but are never available. Such options are displayed with "disabled" attributes.

FILE

The File option is used to save and load image files from disk.

New: (This option is disabled and never used.)

Open: This option displays a standard Open dialog box, like those in standard CUA advanced interfaces. It lets a user to select which bitmap file is to be loaded as the current image. The loaded image is initially scrolled to the upper left of the Telesketch window.

Save: (This option is disabled and never used.)

Save As: This option displays a standard Save As dialog box, like that shown in CUA Advanced Interfaces. It lets a user specify the name of a file in which to store the current bitmap image. Images are stored only as BMP (bitmap) files.

Print: This option sends the current image to the default PM print spooler.

EDIT

This menu option is for manipulating the current Telesketch image in some way.

Mark: This option works the same way as the Mark feature of the OS/2 Windowed Command Prompt. It is used to mark an area displayed on the current image for subsequent Copying to the Clipboard. Selecting Mark toggles on and off the Mark mode, as indicated by a checkmark next to the pull-down item.: When in non-Mark mode, the mouse pointer or touch stylus is used to draw into the current image in the primary window.

When in Mark mode the pointer changes to a NSEW 4-arrowed symbol. When a touchdown (WM_BUTTON1DOWN) occurs, it defines a corner of a "rubber band" rectangle for a custom tracking routine. The user moves the pointer around the window to drag the opposite corner of the rectangle and stretch the rectangle; the rectangle is redrawn each time to indicate which area is being marked. Unlike WinTrackRect, this routine will allow the user to track the rectangle in any direction.

The marking rectangle is "fixed" into place by lifting off the window or releasing a mouse button). The marked area is defined as the area included inside the rectangle, including the edges of the rectangle. The marked area is relative to the area being viewed in the client window, rather than the underlying image. The user may change the marked area by touching down again. At this point, the previous mark rectangle outline is erased, and the new tracking operation starts. The tracking rectangle cannot be stretched outside the primary Telesketch client area window. The area to be marked must be completely viewable in the Telesketch primary window. If the image is scrolled, the marked are remains constant with respect to the new portion of the image being viewed. The Mark function remains active until explicitly toggled off again by the user, or when a "load image" function occurs (Open, Send-/Receive, or Scan).

Copy: Copy is only available if an area has been marked with the Mark pull-down.

When this is selected, the current marked area in the client window is copied as a bitmap image to the PM Clipboard. It is copied in the same bits-per-pel format as it exists in the underlying Telesketch image which may not necessarily match the full capabilities of the display device.

Paste: This option is only selectable if the PM Clipboard currently contains a bitmap image.

When selected, the pointer goes into tracking mode with a rectangle size equal to the image size currently found in the Clipboard so the image can be placed. The user moves the tracking rectangle around the Telesketch client area as a normal tracking operation.

Tracking is started so that no portion of the tracking rectangle may go outside the current Telesketch underlying image. It may go outside the currently viewed image if the window is not large enough to contain the entire rectangle. When the tracking is complete (W-M_BUTTON1UP), the bitmap image from the clipboard is copied into the Telesketch image at the tracking point and simultaneously displayed within the primary window at the corresponding point. The Paste operation is then complete. If the tracking is aborted, the Paste operation is ended without copying from the clipboard.

If the Clipboard bitmap is larger than the entire underlying Telesketch image, the Telesketch image is increased to the size of the Clipboard bitmap before the Paste is completed. Therefore it is not clipped at the edges. No movement of the tracking rectangle within the primary window is possible in this case.

Print Mark: This option is only available if an area has been marked with the Mark pull-down. When selected, this option sends the currently marked area to the standard default PM print spooler. A short delay occurs while the print operation to the spooler occurs.

Scan: This option is used to scan an image as the current Telesketch image using a scanner or camera device. This operation use the OS/2 Image Support facility scanning functions and dialog boxes to accomplish scanning.

Erase: This option is used to clear the current Telesketch image. When it is selected, a PM message box (with Yes/No buttons) appears and asks the user to confirm the erase operation. If "Yes" is chosen, the current image is cleared to all background color; if a remote user is also connected, the remote user's copy of the image is also cleared. No change occurs if the user selects "No" to abort the erase operation.

Capture Screen: This option allows the user to Mark and Copy the PM desktop image and Paste it into the current Telesketch image. When selected, the entire Telesketch application window is made invisible, and a rectangle tracking operation is started. The tracking operates just like the Mark function described above, except that the entire PM desktop may be marked. All windows on the desktop are locked as soon as the tracking operation is started, so they cannot be updated during tracking.

When tracking is completed and the area has been marked, the marking rectangle is removed from the PM desktop, the windows are unlocked, and the Telesketch window is made visible again. If the tracking operation has not been aborted, the sequence continues from this point just like the Paste operation described above. In the preferred embodiment no change is made to the Telesketch image if the operation has been aborted. The captured image is placed into the underlying Telesketch image and simultaneously displayed in the primary window.

Send Image: This option is only available if a connection has been established with a remote Telesketch user via. It is used to send the current image to a remote Telesketch user, to make sure each user has a copy of the same image present. If selected, the current Telesketch image is saved to a file named $TELE_S.BMP in the current directory, in PM bitmap format.

The image file is then compressed to a file named $TELE_S.CPR using a compression algorithm. Images sent over a LAN NETBIOS are generally not compressed; LAN link speed is fast enough so that this step is not required. Then the resulting file is transmitted to the remote Telesketch program using an asynchronous thread for phone line communication, or a $TELE_S.BMP is sent if using a LAN connection.

All Telesketch menu items and pull-downs are disabled during the Send Image operation, and any drawing attempts done within the client area are ignored. The frame window may still be sized, moved, minimized, restored, or maximized during the Send operation. This occurs at both the Sending and Receiving sides of the connection. During the Send, a status message at the bottom of the Telesketch primary window displays "percentage done" progress indicators so the users can see how far along the transmission has progressed. The file is received as $TELE_R.CPR on the receiving end (or $TELE_R.BMP if a LAN connection is used), in the current directory and drive. When the file has been completely sent to the remote side, controls on the local Telesketch are re-enabled to their normal configuration. At the remote side, the received file is decompressed (if the connection is not via LAN) using the ABIC algorithm, and placed in the file named $TELE_R.BMP. $TELE_R.BMP is then loaded as the current image on the remote side, and displayed in the primary window.

CONNECTION

These options are used to control remote Telesketch conferencing sessions.

Call: This option is used to establish a connection to a remote Telesketch application to participate in a conferencing session. It is only selectable if there is no current remote connection already established.

When Call . . . is selected, it displays the "Call" dialog box. This box contains the following controls:
1. "Available Users" list box, lists the "Name's" of those users from the user directory list which have the same connection type as the current Telesketch connection type (see Directory below); a remote session may be established with these users.
2. "Return" pushbutton, dismisses the dialog box 3. "Call" pushbutton, for initiating the calling sequence to establish a connection with the currently selected user entry in the "Available Users" list box. (The calling sequence is also initiated by double-clicking on an entry in the "Available Users" list box. See below for more on steps in the calling sequence.)

Note: An error message box is displayed if no list box entry is currently selected.

4. "Cancel" pushbutton, dismisses the dialog box
5. "Help" pushbutton, for standard CUA contextual Help.

When the calling sequence has been initiated (by double-clicking a list box entry, or pressing the "Call" button), a separate "Calling" dialog box is displayed which contains the following:

1. Static text to indicate the progress of the call (who is being called, number dialed, etc.)
2. "Cancel" button to cancel the call if desired If the connection type is a LAN, the remote user sees a message box asking if he or she wants to participate in a conference and connect to the remote user. If the call is accepted, the local user's dialog boxes are dismissed, and a conference session has been started. The remotely called user is presented with a message box giving him or her the chance to save the current image to a disk file, if desired, before continuing with the conference.

Once a conference is started, all drawing done on one Telesketch is also seen on the other system. The remote session's pointer position within the Telesketch window is shown on the local side with a marker symbol which moves as the remote user's position changes.

If the remote user called refuses the conference, the local user is informed of this by a message box. Dismissing this message box also dismisses the "Calling" dialog box, but leaves the underlying "Call" dialog so that a call may be established with another user if desired.

If a connection is established, the Telesketch primary window title text is appended with "Name" of the person called (if async connection), or the NETBIOS name (if LAN).

This calling sequence design requires that Telesketch be running on both the local ("caller") and the remote ("callee") systems before a conference session is attempted. Some mechanism might also be implemented to start Telesketch automatically on the remote system if it has not already been started. This opens up all sorts of security concerns, however, since a remote user would have the power to affect the operation of the local system.

Hang Up: This option is used to disconnect from a remote session with another user. It is only selectable if a current connection has been established.

When selected, this option displays a message box requesting confirmation to end the connection. If "Yes" is selected, the connection is ended; otherwise it is not ended.

Beep: This option is only selectable if a connection to remote Telesketch user has been established. When it is selected, the option causes a four-tone beep sequence be played on both sides of the connection. It is used to alert the remote side that attention is desired.

Configuration: These options control various miscellaneous configuration items.

Directory: This option is used to make changes to the Telesketch user directory file TELESKCH.DIR. It allows the user to define other Telesketch users that can participate in a remote Telesketch conferencing session.

When the option is selected, it displays the Directory dialog box. This box consists of the following controls:

1. "Name" entry field and associated field prompt, for entering a user's real name (i.e., "Telly Skeezk")
2. "Phone" entry field and associated field prompt, for entering a user's telephone number for async modem connection; must contain valid phone numbers only
3. "Local NETBIOS Name" entry field and associated field prompt, for entering a user's NETBIOS name for LAN connection; text is limited to 8 characters and converted internally to uppercase
4. "Comment" entry field and associated field prompt, for entering miscellaneous comment information to associate with each user directory entry
5. "Connection Type" group box containing radio buttons for choosing one of the following connection types:
   LAN (uses NETBIOS)
   Modem
   Null Modem
   Host (this option is not selectable on the prototype;
6. "Directory" list box, listing the "Name's" for all those user entries currently defined, sorted in ascending alphabetical order; information for the currently selected item within the list box also appears in the entry fields
7. Pushbuttons for controlling the dialog:
   OK - dismisses the dialog; asks for confirmation if changes have been made without "Add"ing or "Change"ing the entry
   Add - adds the entry field and Connection Type information as a new entry into the directory
   Change - changes the information for the currently selected "Directory" list box item, based on information in the entry fields and the "Connection Type" group
   Help - standard CUA contextual Help The current internal user directory list is rewritten to the TELESKCH.DIR file when the "OK" pushbutton is pressed.

Local Name: This option is used to change the local user's Local NETBIOS network name for the next Telesketch LAN session. NETBIOS sessions are established between two unique names on a network. An application may have multiple names in use, and many 1 to 1 sessions between other names on the network at any one time. Telesketch uses this NETBIOS name to make itself known to the network so that it may accept incoming calls and establish conferencing sessions. Some other mechanism must be developed to support n-way conferencing sessions.

In the current version of the invention the entry field is limited to eight-character entries even though NETBIOS names may be up to 16 characters in length. This was done to provide for future expansion possibilities, such as n-way conferences using a base NETBIOS name and appended numbers to indicate different session connections. The local NETBIOS name is stored as an entry in the OS2.INI file for the next invocation of Telesketch. The name is not used until the next time Telesketch is restarted. Local NETBIOS names are converted to all uppercase after entry. The current Local NETBIOS name is appended to the Telesketch primary window title text if the LAN option is in use.

OVERVIEW WINDOW

The discussion of this option is best understood in connection with FIGS. 9 and 10, which depict an overview window 150 inside a Telesketch window 152 which informs the user where the current displayed image 154 and 154' at the local display is located on the common underlying image. This option toggles the Overview Window state on and off, as indicated by a check mark. The overview window is created or destroyed when this option is used.

When the Overview Window option is on, an additional frame window 150 is created as part of the Telesketch application. This window 150 has only a title bar 155 and a thin border 156. The overview window 150 has no sizing border, system menu, etc. In the preferred embodiment it is created as a child of HWND_DESKTOP and owned by the Telesketch primary window with FCF_NOMOVEWITHOWNER. It is not clipped by the Telesketch windows, but is hidden when Telesketch is minimized.

The overview window 150 provides the user with a "bird's eye" view of the common underlying Telesketch image. The underlying image may be much larger than the physical size of the screen or the current image 154 and 154' of the local Telesketch window. The overview window 150 indicates the current local window image position 154_with respect to the underlying Telesketch image. A rectangle 154' in reverse video is drawn to scale in the overview window 150 to show where the current local window is located. When the local Telesketch window 150 is scrolled, the rectangle 154' in the overview window 150 also moves to show the new image portion 154 being viewed. In this case, the user must scroll the image to view different portions in the primary Telesketch window 152. Where the underlying image is large, the user cannot see the entire image at once without the overview window 150.

The overview window 150 shows a reduced version of the entire image. The overview window 150 is sized to maintain the same height-to-width ratio as the underlying image, but small enough to use a display screen space roughly the size of two standard PM icons next to each other. In the preferred embodiment, the sizing algorithm makes the overview window height ¼th the height of the full screen if the underlying image is wider than it is tall. The sizing algorithm makes the overview window width ¼th the full screen width if the underlying image is taller than it is wide. The remaining side is then adjusted to maintain the correct height-to-width ratio as the underlying image. The reduced image in the overview window 150 allows the user to see the entire image at a glance, although with somewhat degraded image quality.

The reduced image in the overview window 150 is updated whenever the primary Telesketch window is updated via WM_PAINT messages. For example, the user has scrolled the local image 154 and 154' down and right in FIG. 10, from his original position in FIG. 10. When this occurs the Telesketch window 152 and the overview window are updated. Updating of the overview window 150 also occurs at regular time intervals of 15 seconds.

In one alternate embodiment, users may scroll through the primary Telesketch image window by dragging the viewing rectangle 154' within the overview window 150. The local Telesketch image window 150 is scrolled to the corresponding location when the viewing rectangle is "dropped" into place in the overview window.

If a connection to a remote Telesketch application is active, the overview window also shows a current viewing rectangle for the remote user. This is indicated by another rectangle (not pictured) within the overview window 150, outlined by a dashed line border. Other ways of distinguishing the local images 154' from the image viewed by remote users are possible, such as denoting each user by different colors or including a user ID in the title bar 155 of the overview windows. The remote viewing rectangle moves whenever the remote user scrolls his or her Telesketch primary window. The rectangle inversion operations of the local and remote viewing rectangle are done in succession, so any overlap in the local and remote rectangles is shown. The remote user's pointer position is also shown within the overview window by a small marker indicator.

Send on Paste: This option toggles the "Send on Paste" state on and off, as indicated by a check mark.

When "Send on Paste" is on, image portions pasted from the PM Clipboard (see "Paste" above) are also sent as small bitmap files to the remote connection (if one exists). They are sent just like in the "Send Image" function (see "Send Image" above) immediately after the portion is pasted into the image. A special Telesketch WM_USER message tells the remote side that an image portion is coming, and also tells it where it should be "pasted". The remote side receives the image portion file, decompresses it as necessary, and places it at the correct position within the current remote image.

This option can potentially slow Telesketch user responsiveness, since image portion transfer can be slow depending on the connection type. An alternative to using the "Send on Paste" state is to send the entire image via the "Send Image" option, and then only on demand.

Send on Capture Screen: This option toggles the "Send on Capture Screen" state on and off, as indicated by a check mark. It is exactly like the "Send on Paste" option except that it sends image portions placed into the current image as a result of the "Capture Screen" operation.

Send on Scan: This option toggles the "Send on Scan" state on and off, as indicated by a check mark. Images which are loaded as the result of a scanning operation are also sent to and loaded into the remotely connected Telesketch, if there is one.

Use of this option can make Telesketch closely resemble operation of a facsimile machine. Very little user intervention is required to transmit an image from paper to a remote location of viewing. An additional "Save incoming images to disk files" operating on an unattended Telesketch session is even more like a fax machine. Some API exits to trap incoming images to files are used for such an embodiment. Then again, this starts to make Telesketch a mail facility rather than a real-time conference facility.

Send on Open: This option toggles the "Send on Open" state on and off, as indicated by a check mark. Images which are loaded as the result of a File+Open . . . operation are also sent to and loaded into the remotely connected Telesketch, if there is one.

This option simplifies the number of user steps involved if two users are viewing many saved images in the course of a remote conferencing session.

DRAW

This menu item is used to change the current style for drawing with the stylus (or mouse pointer) when in drawing mode (non-Mark mode). Any of the following drawing modes are possible:

1. Freehand
2. Freehand erase
3. Line
4. Circle outline
5. Filled circle
6. Rectangle outline
7. Filled rectangle
8. Erased rectangle
9. Text (typed)

Freehand: This option is checked as the default when Telesketch is started. When this is selected, any of Line/Circle/Rectangle modes is turned off.

In Freehand mode, touch-downs (WM_BUTTON1-DOWN) in the client area of the Telesketch window start the ink trail going. Subsequent pointer movements (WM_MOUSEMOVE) cause the pointer to move to a new position within the client area, and a line is drawn from the previous point to the current point. Normal writing operations made in Telesketch cause an image to be created, much like drawing on a piece of paper with a pencil. Drawing continues until a lift-off (WM_BUTTON1UP) occurs. The pointer changes to shape of a pencil while drawing.

Touching with button 2 (or stylus with the lower bezel button held down) makes Telesketch go into "freehand erase" mode. In this mode, the pointer is changed to an eraser shape. Moving the pointer around causes a banded area (or "path") to be changed back to the image background color as the pointer is moved. It operates much like dragging a pencil eraser across a sheet of paper (although it is a much smoother operation). Erase mode ends when the lift-off (WM_BUTTON2UP) occurs. In the preferred embodiment, erase mode is always available, regardless of the Freehand, Line, Circle, Rectangle, or Erase Rectangle mode in use.

Line: When this is selected, any of Freehand/Circle/Rectangle modes are turned off and this mode is turned on. A checkmark next to the option indicates the current state.

In Line mode, a touch-down, move, lift-off sequence is used to created straight lines between two points. On touch-down (WM_BUTTON1DOWN), the first end point of the line is defined. Subsequent movements cause a "rubber band" line to stretch from the first end point to the current pointer position. Lift-off (WM_BUTTON1UP) determines the second end point, and a line is drawn between the two points. Another line may be drawn by repeating the sequence.

Circle: When this is selected, any of Freehand/Line/Rectangle modes are turned off and this mode is turned on. A checkmark next to the option indicates the current state.

In Circle mode, a touch-down, move, lift-off sequence is used to create circles. On touch-down (WM_BUTTON1DOWN), the center of the circle is defined. Subsequent movements cause a "rubber band" circle to stretch around the center point with a radius at the current pointer position. Lift-off (WM_BUTTON1UP) determines the final radius, and a circle is drawn. Another circle may be drawn by repeating the sequence.

Rectangle: When this is selected, any of Freehand/Line/Circle/Rectangle modes are turned off and this mode is turned on. A checkmark next to the option indicates the current state.

In Rectangle mode, a touchdown, move, lift-off sequence is used to create rectangles between two opposite corner points. On touchdown (WM_BUTTON1DOWN), the first corner of the rectangle is defined. Subsequent movements cause a "rubber band" rectangle to stretch from the first point to the current pointer position. Lift-off (WM_BUTTON1UP) determines the opposite corner, and a rectangle is drawn with these corner points. Another rectangle may be drawn by repeating the sequence.

Erase Rectangle: This option is only available if Rectangle is the current drawing mode. It affects only Rectangle mode drawing. If this is selected, a check mark indicates its "on" state. When Erase Rectangle is on, the pointer behaves as it does while in Rectangle mode. However, after the two corners of the rectangle have been defined, the interior and outline of the resulting area are erased to the background color.

This option must be explicitly toggled off if normal Rectangle mode is desired. Selecting any of Line/Rectangle/Circle does not turn this mode off. The start-up default for Erase Rectangle is "off."

Fill: This option is always available, but it affects only Rectangle (not Rectangle+Erase Rectangle) and Circle mode drawing. If this is selected, a check mark indicates its "on" state.

If Fill mode is on, rectangles and circles are drawn and also filled in with the drawing color. If fill mode is off, rectangles and circles only draw the outlines, and not the interior. This option must be explicitly toggled off if normal outline style drawing is desired. The start-up default for the Fill option is "off."

Text Support: Telesketch supports the insertion of keyboard typed text into a Telesketch presentation space. Typed Text can be placed in a Telesketch presentation space by one of two methods:

1. By choosing the menu item Typed Text off of the Edit Action Bar Item. Choosing this menu item causes a Text Entry Window to be displayed in which the intended text can be entered. Pressing either the OK button or the enter key after entering the text, causes an outline box the size of the entered text to be displayed on the Telesketch presentation space. The user can then move the outline box to the preferred location and upon BUTTON1UP the typed text will be placed in the presentation space.
2. If the cursor is in the presentation space and the user enters a character, via the keyboard, a Text Entry Window will be displayed, allowing the user to continue typing the text that he/she wishes to be displayed in the presentation space. This method allows the user to simply start typing text in the presentation space, then choose the desired size and font. Pressing either the OK button or the enter key after entering the text, causes an outline box the size of the entered text to be displayed on the Telesketch presentation space. The user can then move the outline box to the preferred location and upon Button1Up the typed text will be placed in the presentation space.

The support of varying fonts is supplied by the windowing system that Telesketch interacts with. In the case of OS/2 presentation manager, numerous fonts and sizes are available to display text with. The setting of fonts is accomplished while interacting with the Type Text dialog. In addition to supplying a Text Entry Window, the OK, Cancel and Help buttons, a Fonts button is also provided. Pressing this button causes a secondary dialogue to be displayed. This secondary dialogue allows the setting and choosing of a particular font and font size via two list boxes, one lists the available fonts, the other lists the available font sizes for a selected font.

Help for help . . . Standard Help information is displayed using the OS/2 Information Presentation Facility, as described in CUA Advanced Interface Design Guide.

Extended help . . . Standard Help information is displayed using the OS/2 Information Presentation Facility, as described in CUA Advanced Interface Design Guide.

Keys help . . . Standard Help information is displayed using the OS/2 Information Presentation Facility, as described in CUA Advanced Interface Design Guide.

Help index . . . Standard Help information is displayed using the OS/2 Information Presentation Facility, as described in CUA Advanced Interface Design Guide.

Tutorial . . . (This option is disabled and never used. No tutorial is provided for Telesketch.)

About . . . A standard About logo box is displayed. It is dismissed by pressing the "OK" button.

INVOCATION TABLE

In its preferred embodiment, Telesketch is started from any program group or OS/2 command line. It should have its directory file TELESKCH.DIR in the current directory or DPATH. The following start-up options are currently provided (some are also settable during use via menu options):

/? displays start-up options, then exits
/MIN starts minimized
/XY x y positions window at (x,y) after start-up
TIMESTAMPSTATUS includes time stamp in status window, for debugging purposes
/RTC makes Receive thread time-critical priority (default)
/NORTC makes Receive thread regular priority
SENDPASTE causes automatic send of paste portion if connected
/NOSENDPASTE turns off /SENDPASTE (default)
/SENDSCAN causes automatic send of scanned image if connected
NOSENDSCAN turns off /SENDSCAN (default)
SENDCAPTURE causes automatic send of captured image portion if connected
/NOSENDCAPTURE turns off /SENDCAPTURE (default)
/SENDOPEN causes automatic send of opened (loaded) image if connected
/NOSENDOPEN turns off /SENDOPEN (default)
/BW creates drawing area as black and white presentation space (default)
/COLOR creates drawing area as 4-bits-per-pel color presentation space
/OV turns on the Overview window
/NOV turns off /OV (default)
/3118 selects scanner type of IBM 3118 scanner (default)
/3119 selects scanner type of IBM 3119 scanner
/NC disables image file compression completely, for any send operation
/NULLMODEM starts for null modem connection
/MODEM starts for modem connection
/LAN starts for NETBIOS (Token-Ring) connection
/TESTNAME starts as /LAN, but uses "TEST" as local NETBIOS name, for testing purposes on single machine
/NAME (name) starts as /LAN, but uses "name" as local NETBIOS name, for running multiple copies on single machine At start-up, Telesketch displays its product logo box, and then its primary window.

TELESKETCH MESSAGE PROCESSING

Messages are the main source of communication between Telesketch applications. They are used to pass information or synchronize tasks. By passing information, a user of Telesketch will know the current status of the other users and what objects have been drawn. Messages are also used to synchronize tasks such as handshaking when a connection is requested and when large amounts of data are transmitted.

A Telesketch session can consist of thousands of individual messages are, as messages the fundamental communication medium, used for communicating cursor locations, pen up or pen down, transmission of data, and other items. It was decided to not have internal checking of each message sent, either via CRC numbers or confirmation messages sent from the receiver to the sender, when messages are received. Implementing error checking for all messages would have seriously impacted the performance of the Telesketch session, and in the majority of messages, an error in the sending of the message does not create a fatal situation, the overall communication is not greatly effected, as much of the information communicated in a Telesketch session is gathered from the context of all the messages sent and received, and the loss of an individual message does not greatly effect the efficiency of Telesketch as a communication medium.

MESSAGE FORMAT

Telesketch messages have a format similar to the OS/2 Presentation Manager messages, e.g., Message ID, Message Parameters 1 and 2). In addition, an extra ID, usually a User ID is pre-pended to each message sent over the communication line, Async port or LAN. This will help in identifying where the message came from. In a multi-user Telesketch conference the User ID is significant.

In most cases, the message is sent "as is" over the communication line. In some cases, such as communicating over a telephone line (via modem), data compression is used to increase the performance over a slower communication line.

STATUS INFORMATION MESSAGES

Status messages provide information of the remote Telesketch environment. Some of these messages are sent automatically and some are sent as a response to a query.

Cursor Position: Whenever the cursor is moved within the Telesketch window, the remote user should also see the current position, provided that the remote user is viewing the same logical area.

In order to reflect the current cursor position to the remote user, the OS/2 PM message, WM_MOUSEMOVE, is echoed over the communication line. The WM_MOUSEMOVE message with its parameters are sent over the communication line with a User ID added.

WM_MOUSEMOVE messages received from the communication line are treated separately from the local mouse move messages. This allows the user to view distinct representations of the local and remote users. The user ID is used to distinguish where the mouse move message originated, thus allowing further distinction between incoming messages.

Viewing position: Since the actual drawings area of Telesketch can be bigger than what is currently being viewed, information pertaining to the window location on the image should be passed. Whenever the Telesketch window is sized or scrolled, a Window Position message should be sent. The parameters to this message should be the location of the lower left corner and the current width and height of the rectangle.

To keep the image between Telesketch user consistent, these messages are used to keep up with the remote user's current position. Therefore, drawn object can be placed in their correct locations.

User Attention Request (beeping): A message of this type is sent to the remote user when his/her attention is requested. On receipt of this message a short beep is sounded. No parameters are required and no response is needed.

DRAWINGS MESSAGES

These messages are passed to remote Telesketch applications to indicate the current object being drawn.

Freehand Drawing: During the freehand drawing mode, three messages are echoed in the remote user. Locally, the WM_BUTTON1DOWN, WM_MOUSEMOVE, and WM_BUTTON1UP messages are echoed to the remote session of Telesketch (the original message parameters are also passed). The WM_BUTTON1DOWN messages indicate the beginning of the freehand drawing. The WM_BUTTON1UP message indicates the end of the freehand drawing. The WM_MOUSEMOVE messages received between the WM BUTTON1DOWN and WM_BUTTON1UP indicate the freehand drawing lines between the start and stop point.

The reception of WM_BUTTON1DOWN, WM_MOUSEMOVE, and WM_BUTTON1UP messages from the communication line are processed separately from the local messages of the same name. This would allow the user to see the progress of the different users on the same Telesketch window.

Erasing: During the erase drawing mode, three messages are echoed to the remote user. Locally, the WM_BUTTON2DOWN, WM_MOUSEMOVE, and WM_BUTTON2UP messages are echoed to the remote session of Telesketch (the original message parameters are also passed). The WM_BUTTON2DOWN messages indicate the beginning of the erasing mode. The WM_BUTTON2UP message indicates the end of the erasing mode. The WM_MOUSEMOVE messages received between the WM_BUTTON2DOWN and WM_BUTTON2UP indicate the erased lines between the start and stop point.

The reception of the WM_BUTTON2DOWN, WM_MOUSEMOVE, and WM_BUTTON2UP messages from the communication line are processed separately from the local messages of the same name. This would allow the user to see the progress of the different users on the same Telesketch window.

Circle Drawing: The circle drawing mode is known only to the local user. Once the local user is in the circle drawing mode, the WM_BUTTON1DOWN and WM_BUTTON1UP messages are not echoed.

Circle drawings can be filed or just an outline. When the circle is drawn, a message is sent to the remote user indicating that a circle has been drawn. Two different Circle messages are required, one for a filled circle and for an outline circle. Both messages contain information on the position of the circle's center and its radius.

Rectangle Drawing: The rectangle drawing mode is known only to the local user. Once the local user is in the rectangle drawing mode, the WM_BUTTON1DOWN and WM_BUTTON1UP messages are not echoed.

Rectangle drawings can be filled or just an outline. Filled rectangle can be filled with a neutral color (contrasting with the background color) or with the background color (simulating the erase of an area). When the rectangle is drawn, a message is sent to the remote user indicating that a rectangle has been drawn. Three different Rectangle messages are required, one for an outline rectangle, one for a filled rectangle, and one for a filled rectangle with the background color. All rectangle messages contain the position information on the upper left and lower right corners of the rectangle.

Line Drawing: The line drawing mode is known only to the local user. Once the local user is in the line drawing mode, the WM_BUTTON1DOWN and WM_BUTTON1UP messages are not echoed.

Once a line has been drawn, a Line message is sent to the remote user indicating that a line has been drawn. The Line message contains information on the position of the start and end of the line segment.

HANDSHAKING MESSAGES

Telesketch can connect users via the Async port or over a LAN. In either case some form of handshaking should be performed when one user's is requesting another user attention on Telesketch.

Making a Modem Connection: A Modem connection can be created through the use of a Modem or a Null modem cable. Once the connection is made, Messages are passed to establish a logical Telesketch connection. The user requesting the connection sends "Hello" message to the remote user. Once the remote user receives this message, an "Acknowledgement" message is returned and the Telesketch session begins. The remote user has the choice to accept or reject the "call." In either case, the acknowledgement message is returned with the response.

Making a LAN Connection: A user requesting a Telesketch session over a LAN must first establish a NETBIOS session. The Telesketch running on the remote terminal monitors the LAN for the request to establish a session. When the NETBIOS session is established, a local message is posted indicating that a user is requesting a Telesketch communication session. This request can be accepted or denied. In either case an "acknowledge" message is sent back to the requesting user with the desired response. If the call is accepted, the Telesketch session begins, otherwise, the NETBIOS session is dropped.

DATA PASSING

During a Telesketch session, a user may want to pass large amounts data between Telesketch users. This data is usually updates to the current Telesketch screen image. To separate byte stream data from the Telesketch messages, all Telesketch messages are paused from continuing over the communication line until all byte data is passed.

Sending the Current Image: At the user's request, the current Telesketch image can be sent to the remote user. When such a request is made, a "Send File" message is sent to the remote user indicating that image data is being sent. The "Send File" message contains the number of bytes that will be sent and the position of the lower left corner to which the image will be placed. Transmission of all other messages is then suspended. An "Acknowledge" message is returned to the originator indicating that the receive is ready to receive. When the "Acknowledge" message is received, the stream of bytes representing the image is sent over the communication line. Once all of the data is received, it is loaded into the receiver's Telesketch window for display, placing the image's lower left corner at the specified point.

Data Compression: Telesketch uses data compression methods to reduce the amount of information which needs to be transmitted between remotely connected machines. Specific information is compressed, transmitted, and decompressed at the receiving end in less time than would be necessary to transmit and receive the raw (uncompressed) data. Less CPU time is used waiting for remote input, and the local user can do more useful work.

Data compression (or compaction) is used by Telesketch in two areas:
1. Window message exchanges, and
2. Complete image file transmission Window Message Compacting: The message sent between two (or more) Telesketch machines are standard Presentation Manager window messages and Telesketch-defined additions to these standard messages (WM_USER+x). These messages, in their "uncompacted" form, take up a total of 10 bytes:

| WinSendMsg (hwnd, msg, mp1, mp2): | |
|---|---|
| USHORT msg: | 2 bytes |
| MPARAM mp1, | 4 bytes |
| mp2: | 4 bytes |
| | 10 bytes total |

If the connection mechanism is relatively slow, such as an asynchronous modem connection at 2400 baud, many messages sent in a short period of time can result in many bytes buffered and eventually transmitted. For example, many WM_MOUSEMOVE messages (the user moves the pointer around the window) made in a few seconds while writing some text on the Telesketch primary window could easily generate hundreds of bytes of data which would need to be sent.

However, a large percentage of the messages which are sent between Telesketch systems do not need to take the full 10 bytes to send all their pertinent information. Telesketch takes the most common of the messages and compacts them into a smaller format before transmitting them to the remote system. The remote system then uncompacts them using the reverse scheme, and forwards them on to the main Telesketch code. Only those messages specifically chosen as "most frequently sent" are compacted. All messages are sent as-is, with a leading message ID byte of 0.

The most commonly transmitted messages (mouse pointer movements and button presses) are decreased to less than half their original message packet sizes. This results in an effective doubling of throughput for these messages.

Image File Compression: When the Send Image function of Telesketch is activated the entire current underlying image is sent to the remotely connected machine. The resulting image bitmap files are so big that sending them at typical commercially available modem speeds (1200, 2400 baud) takes on the order of 5 or so minutes. Black and white images (8.5×11") scanned from an IBM 3118 scanner at low resolution produce a bitmap image file of approximately 170,000 bytes of data which must be transmitted. A "standard" size PM desktop image (in black and white format) produces a bitmap file of approximately 37,000 bytes. Any decrease in the time needed to transmit an image is preferable, with the goal being as near instantaneous as possible.

A number of different black and white image compression algorithms were tested with various Telesketch sample images. These included:
1. Scanmaster 1 (IBM MMR)
2. Modified Huffman (CCITT i-d)
3. Modified READ (CCITT 2-d) k=2
4. Modified READ with K=4
5. TIFF algorithm 4 (compatible w/G4 MMR)
6. TIFF algorithm 2
7. ABIC algorithm Our tests indicated that the ABIC algorithm was the best choice for our hand-drawn images and simple scanned images.

The best compression algorithm for the Telesketch application was found to be that implemented in IBM's Adaptive Bilevel Compression (ABIC) also known as the "Q-Coder". A software version of the "Q-Coder" is described in an article by W. B. Pennebaker and J. L. Mitchell, in the IBM J. Res. Develop., Vol. 32, No. 6, pps. 753-774, November 1988, entitled "Software Implementations of the Q-Coder". The arithmetic coder used for the ABIC chip uses a "Q-Coder" as described in another article in the same IBM Journal of Research and Development of November 1988, at pps. 775-795, entitled "A Multi-Purpose VLSI Chip For Adaptive Data Compression Of Bilevel Images", by R. B. Arps et al. It will be appreciated that the arithmetic coding compression algorithm can be implemented in either hardware or software. In the former case, the functions may be incorporated in a VLSI chip, of a type such as IBM's Adaptive Bilevel Image Compression (ABIC) chip, discussed in the above-cited R. B. Arps et al. article in the IBM Journal at pps. 775-795, and in the latter case, the software may be adapted to run on a general purpose computer, such as an IBM S/370.

The following patents provide teachings of specific improved implementations of arithmetic coding embodied in the "Q-Coder":

U.S. Pat. No. 4,891,643, issued Jan. 2, 1990 to J. L. Mitchell and W. B. Pennebaker, entitled "Arithmetic Coding Data Compression/De-Compression By Selectively Employed, Diverse Arithmetic Encoders and Decoders";

U.S. Pat. No. 4,905,297, issued Feb. 27, 1990, to G. G. Langdon Jr., J. L. Mitchell, W. B. Pennebaker, and J. J. Rissanen, entitled "Arithmetic Coding Encoder And Decoder System"; and allowed applications, U.S Ser. No. 193,170, filed May 3, 1988, by J. L. Mitchell and W. B. Pennebaker, entitled "Probability Adaptation For Arithmetic Coders";

U.S. Ser. No. 222,332, filed Jul. 20, 1988, by W. B. Pennebaker and J. L. Mitchell, entitled "Probability Estimation Based On Decision History";

Black and white scanned images can typically be reduced from about 170,000 bytes down to 15,000 bytes or less, depending on the complexity of the images. Smaller images of about 37,000 bytes typically compress to 5,000 or so bytes, depending on complexity. Telesketch could use any of the above compression/decompression algorithms to decrease the time necessary to transmit entire image files.

If the LAN connection mechanism is used, Telesketch does not bother performing the compression and decompression steps. Large image files (such as 170,000 byte files produced from an IBM 3118 scanner) sent over a 4 MB/sec Token-Ring network can typically be sent in under 5 seconds. The compression and decompression steps typically take more than 5 seconds (sometimes 8-10 seconds), so it is better to send the original, uncompressed file in this case.

ERROR RECOVERY

Error recovery is a difficult task in Telesketch, as several aspects of error recovery must be considered. The types of errors which can occur in Telesketch will normally fall in the following categories:

Operating System - These are errors related to the base operating system that the Telesketch application is being executed on. Such errors are often fatal, in the sense they represent conditions which are not easily ignored. For such errors the Telesketch application will present a messaged box displaying the error message received from the operating system and allow the user to "gracefully" end the Telesketch application. All efforts will be made to avoid "crashes." If the Telesketch application can provide additional information about the error, that information will also be provided via the message box.

Window System Errors - These errors relate to the creation and interaction with presentation spaces that are controlled by the windowing system. Errors in the creation of presentation spaces is often a "fatal" error, and in such cases the method described for handling "fatal" operating system errors would be followed. Non-fatal windowing system errors would be reported to the user and the user would be given the opportunity to continue the Telesketch session (knowing that errors have been encountered, and such errors may impact the session), or to end the session.

Communication Errors - Communication errors consist of several categories:

Connecting to another user: If Telesketch is unable to connect to the Telesketch session of a selected user of the remote computer system, then the error should be reported to the user requesting the connection, and the user is given the choice of ending or continuing the session.

Message Errors: Once a multiway connection has been established, all Telesketch messages contain a sequencing byte, which establishes the proper sequence in which the original message was sent, and an identification byte, which identifies who sent the message. Thus, a Telesketch session which receives messages will realize an error has occurred when a message is received out of sequence or when an expected message is not received (message 6 is received, followed by message 8, i.e., message 7 has been lost). When the initial message out of sequence error is detected, Telesketch alerts the receiving user via a message box. The user can then choose to continue or end the session. Additional message out of sequence errors are reported to the receiving user via the string "Message nn from yy received out of sequence" displayed in an Error window in the Telesketch presentation space. Display of error messages can be halted by "turning off" the Error Message window via selecting Error Message Window item on the Options menu bar.

Data Transmission Errors: Telesketch transmits two kind of data, graphical (bitmaps, presentation spaces, image files) and text data (text strings, font size, location).

Graphical data is sent with a Cyclical Redundancy Check (CRC) number. The CRC number is used by the receiving Telesketch session to compare to the CRC number calculated from the received graphical data. If the two CRC numbers are equal, then the graphical data was received without problems, and the data is displayed. If the CRC numbers are not equal, the receiving Telesketch session notifies the sending session that an error has occurred. The sending session then sends a new copy of the graphical data. If the CRC numbers upon receiving the new copy are still not equal, indicating an error in transmission, a message is displayed to the receiving user, indicating the error in transmission, and giving the user the choice to continue or end the session.

Errors in the transmission of data are also handled by the use of CRC numbers, but on the second failure to receive the text string correctly the receiving Telesketch session will display the received text as is, and display an error message in the Error Message Static Window.

While the present invention has been described with reference to specific embodiments it will be understood by those given the art that changes in form or detail may be made without the parting from the spirit and scope of the invention. The embodiment presented above are for purposes of examples and illustration only, and are not to be taken to limit the scope of the invention narrower and the scope of the appended claims.

We claim:

1. A first data processing system for transmission and reception of realtime freehand drawing to and from a second data processing system, each system having a processor coupled to a memory, a display and an input device, each of said system having an operating system which runs a plurality of application programs each displayed in a respective one of a plurality of windows on the display, the first data processing system comprising:

means for presenting a first set of points in a first window on the display in said first data processing system, the first set of points representing freehand drawing generated by the input device at the first data processing system;

means for sending the first set of points to the second data processing system;

means for receiving and presenting a second set of points in the first window, the second set of points representing freehand drawing generated at the second data processing system;

means for presenting a first set of image data from a first image handling application in a second window in said first data processing window;

means for importing said first image data from said second window to said first window;

said sending means, sending said first image data to said second data processing system from said first window;

wherein the input device is a touch sensitive overlay disposed over the viewing surface of a display which generates the first set of points as the overlay is contacted on a surface facing opposite to the viewing surface of the display.

2. A first data processing system for transmission and reception of realtime freehand drawings to and from a second data processing system, each system having a processor coupled to a memory, a display and an input device, each of said system having an operating system which runs a plurality of application programs each displayed in a respective one of a plurality of windows on the display, the first data processing system comprising:

means for presenting a first set of points in a first window on the display in said first data processing system, the first set of points representing freehand drawing generated by the input device at the first data processing system;

means for sending the first set of points to the second data processing system;

means for receiving and presenting a second set of points in the first window, the second set of points representing freehand drawing generated at the second data processing system;

means for presenting a first set of image data from a first image handling application in a second window in said first data processing system;

means for importing said first image data from said second window to said first window;

said sending means, sending said first image data to said second data processing system from said first window;

wherein the means for importing and presenting image data is a screen capture module which can capture image data from the first image handling application even if the first image handling application cannot interact with a utility of the operating system which transfers data between applications.

3. A first data processing system for transmission and reception of realtime freehand drawing to and from a second data processing system, each system having a processor coupled to a memory, a display and an input device, each of said system having an operating system which runs a plurality of application programs each displayed in a respective one of a plurality of windows on the display, the first data processing system comprising:

means for presenting a first set of points in a first window on the display in said first data processing system, the first set of points representing freehand drawing generated by the input device at the first data processing system;

means for sending the first set of points to the second data processing system;

means for receiving and presenting a second set of points in the first window, the second set of points representing freehand drawing generated at the second data processing system;

means for presenting a first set of image data from a first image handling application in a second window in said first data processing system;

means for importing said first image data from said second window to said first window;

said sending means, sending said first image data to said second data processing system from said first window;

means for presenting a second window on the display the second window presenting an overall image which is larger than and includes the image presented in the first window and a rectangle indicating which portion of the overall image is presented in the first window.

4. A first data processing system for transmission and reception of realtime freehand drawing to and from a second data processing system, each system having a processor coupled to a memory, a display and an input device, each of said system having an operating system which runs a plurality of application programs each displayed in a respective one of a plurality of windows on the display, the first data processing system comprising:

means for presenting a first set of points in a first window on the display in said first data processing system, the first set of points representing freehand drawing generated by the input device at the first data processing system;

means for sending the first set of points to the second data processing system;

means for receiving and presenting a second set of points in the first window, the second set of points representing freehand drawing generated at the second data processing system;

means for presenting a first set of image data from a first image handling application in a second window in said first data processing system;

means for importing said first image data from said second window to said first window;

said sending means, sending said first image data to said second data processing system from said first window;

wherein, the first data processing system is in communication with a plurality of data processing systems each equipped similarly to the first data processing system, the second window presenting the overall image and a plurality of rectangles indicating which portions of the overall image are presented in a respective first window of each of the plurality of data processing systems.

5. A method for transmission and reception of realtime freehand drawing between a first data processing system and a second data processing system, each of the data processing systems having a processor, a memory, an input device and a display and an operating system which runs a plurality of application programs each displayed in a respective one of a plurality of windows on the display, the method comprising the steps of:

presenting a first set of image data from a first image handling application in a first window on the display of the first data processing system;

importing said first image data from said first window to a second window on the display of said first data processing system;

presenting a first set of points representing freehand drawing in the second window, the first set of points generated by the input device at the first data processing system;

sending the first image data and the first set of points from said second window to the second data processing system;

receiving and presenting a second set of points representing freehand drawing in the second window, the second set of points generated at the second data processing system; and presenting a third window on the display, the third window presenting an overall image which is larger than and includes the image presented in the second window and a rectangle to indicate which portion of the overall image is presented in the second window.

6. The method as recited in claim 5 wherein the system is in communication with a plurality of data processing systems each equipped similarly to the first data processing system, the third window presenting the overall image and a plurality of rectangles to indicate which portions of the overall image are presented in a respective second window of each of the plurality of data processing systems.

7. The method as recited in claim 6 which further comprises the step of sending the image presented in the second window of the first data processing system to the plurality of data processing systems to assure that the same image is shared by the plurality of data processing system for the portion of the overall image presented by the second window of the first data processing system.

* * * * *